(12) United States Patent
Kai et al.

(10) Patent No.: US 9,202,622 B2
(45) Date of Patent: Dec. 1, 2015

(54) WELDING TRANSFORMER AND WELDING TRANSFORMER ASSEMBLY AND WELDING APPARATUS

(75) Inventors: Koji Kai, Sagamihara (JP); Kazuki Houzan, Sagamihara (JP); Akira Nagai, Sagamihara (JP); Kazuhiro Suzuki, Sagamihara (JP)

(73) Assignee: KOYO GIKEN INC., Kanagawa (JP)

( * ) Notice: Subject to any disclaimer, the term of this patent is extended or adjusted under 35 U.S.C. 154(b) by 0 days.

(21) Appl. No.: 13/813,174

(22) PCT Filed: Jun. 29, 2012

(86) PCT No.: PCT/JP2012/066646
§ 371 (c)(1),
(2), (4) Date: Mar. 28, 2013

(87) PCT Pub. No.: WO2013/128663
PCT Pub. Date: Sep. 6, 2013

(65) Prior Publication Data
US 2014/0360994 A1 Dec. 11, 2014

(30) Foreign Application Priority Data
Feb. 29, 2012 (JP) ................................. 2012-042873

(51) Int. Cl.
*B23K 11/24* (2006.01)
*H01F 27/06* (2006.01)
(Continued)

(52) U.S. Cl.
CPC ............ *H01F 38/085* (2013.01); *B23K 11/115* (2013.01); *B23K 11/241* (2013.01); *B23K 2201/18* (2013.01); *H01F 2027/408* (2013.01)

(58) Field of Classification Search
CPC ......... B23K 11/24; H01F 27/08; H01F 27/30; H01F 27/28; H01F 38/085
See application file for complete search history.

(56) References Cited

U.S. PATENT DOCUMENTS 5,160,820 A * 11/1992 Tsujii et al. .................... 219/116
6,369,680 B1 * 4/2002 Brinckmann et al. ........... 336/60
(Continued)

FOREIGN PATENT DOCUMENTS

| JP | 4-127973 | 4/1992 |
| JP | 6-23564 | 2/1994 |

(Continued)

OTHER PUBLICATIONS

International Preliminary Report on Patentability issued in PCT/JP2012/066646, Feb. 9, 2014, pp. 1-4.
(Continued)

*Primary Examiner* — Brian Jennison
(74) *Attorney, Agent, or Firm* — Jeffrey S. Melcher; Manelli Selter PLLC

(57) ABSTRACT

It is possible to control a welding in a high speed and a high precision large electric current, and consumption electric power is also reduced. In the welding transformer, a loop magnetic core 25, a wound primary coil 12, plural positive side coils 14 and plural negative side coils 16 that are alternately sandwiched between respective gaps 12a of the primary coil 12, are comprised. A coil is fixed on the other surface of a contact base member 62. On the other surface of the contact base member 62, a first connection polar board 44 is electrically connected to a positive side electric conductor 30 through the first connection polar board 44. A negative side coil 16 is electrically connected to a negative side electric conductor 32. The connecting part of the positive side coil 14 and the negative side coil 16 is electrically connected to the third connection polar board 48. By sandwiching a thin insulation layer 31, a positive side electric conductor 30, a rectifying device 18 and a first polar board 34 are arranged on one side; A negative side electric conductor 32, a rectifying device 20 and a second polar board 36 are arranged on the other side; and the first polar board 34 and the second polar board 36 are electrically connected to a third polar board 38. It is possible to use by combining plural units and by connecting an output side in parallel in a small size and a large capacity.

19 Claims, 31 Drawing Sheets

(51) Int. Cl.
  *H01F 38/08* (2006.01)
  *B23K 11/11* (2006.01)
  *H01F 27/40* (2006.01)

(56) References Cited

U.S. PATENT DOCUMENTS

| | | | |
|---|---|---|---|
| 6,794,976 B2 * | 9/2004 | Sigl | 336/170 |
| 2008/0272874 A1 * | 11/2008 | Chang | 336/61 |

FOREIGN PATENT DOCUMENTS

| | | |
|---|---|---|
| JP | 6-151211 | 5/1994 |
| JP | 6-170551 | 6/1994 |
| JP | 8-197260 | 8/1996 |
| JP | 10-85947 | 4/1998 |
| JP | 2002-144050 | 5/2002 |
| JP | 2002-263839 | 11/2002 |
| JP | 2007-38227 | 2/2007 |
| JP | 2008-105041 | 5/2008 |
| JP | 2009-291827 | 12/2009 |
| JP | 2010-20547 | 1/2010 |
| JP | 2011-5544 | 1/2011 |
| JP | 2011-82478 | 4/2011 |

OTHER PUBLICATIONS

Translated Written Opinon issued in PCT/JP2012/066646, Oct. 9, 2012, pp. 1-4.

* cited by examiner (a) Fig 10A (b) Fig 10B

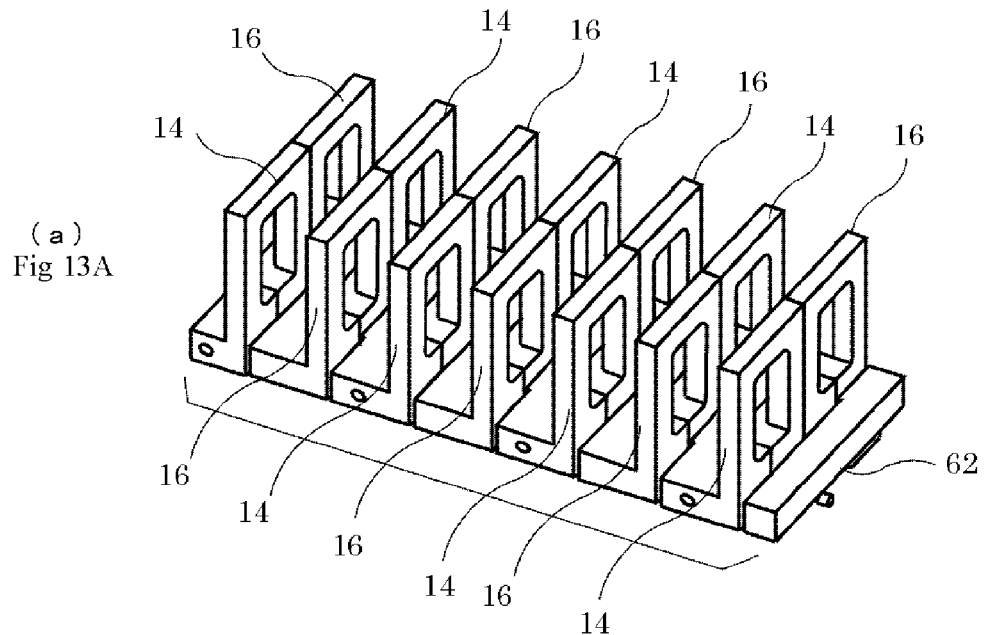
(a) Fig 13A
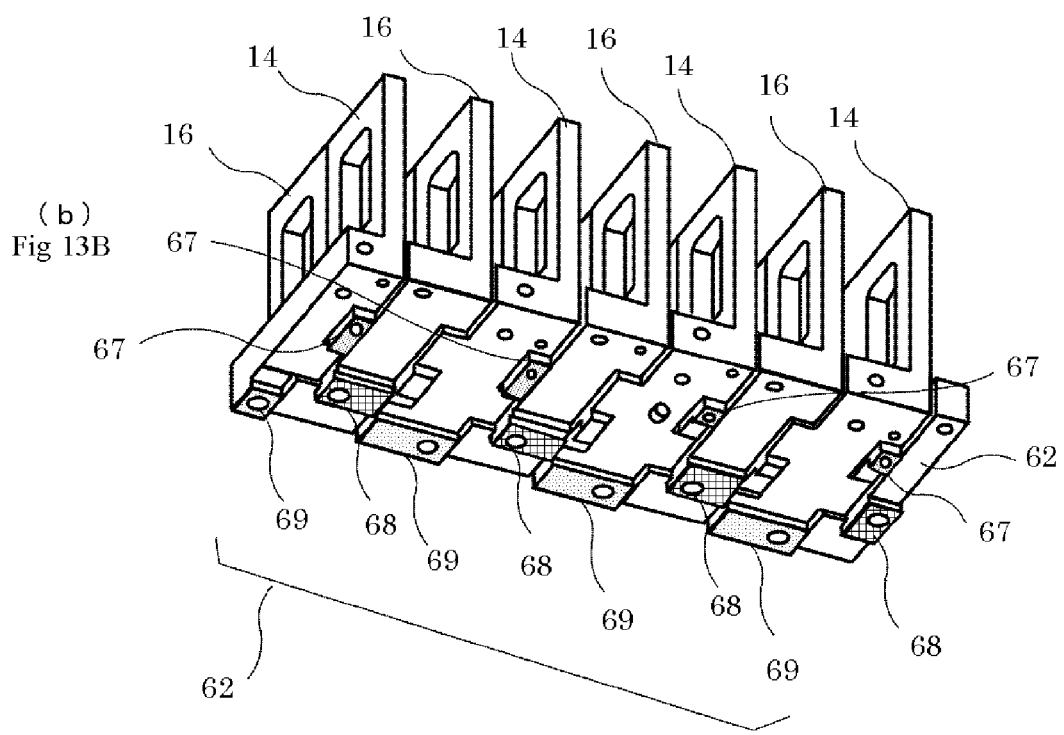
(b) Fig 13B
Fig 13

(a)
Fig 22A
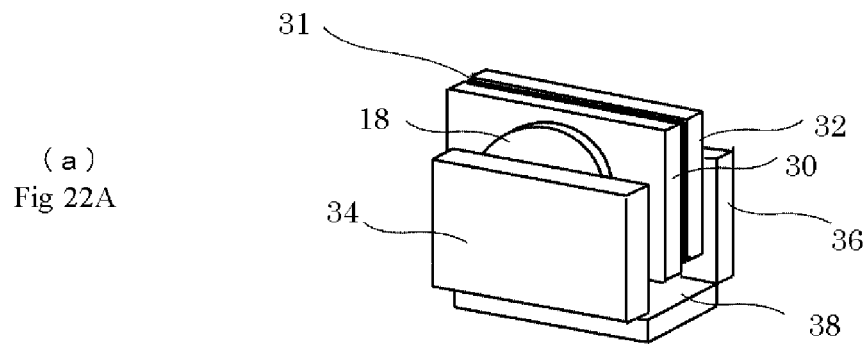
(b)
Fig 22B
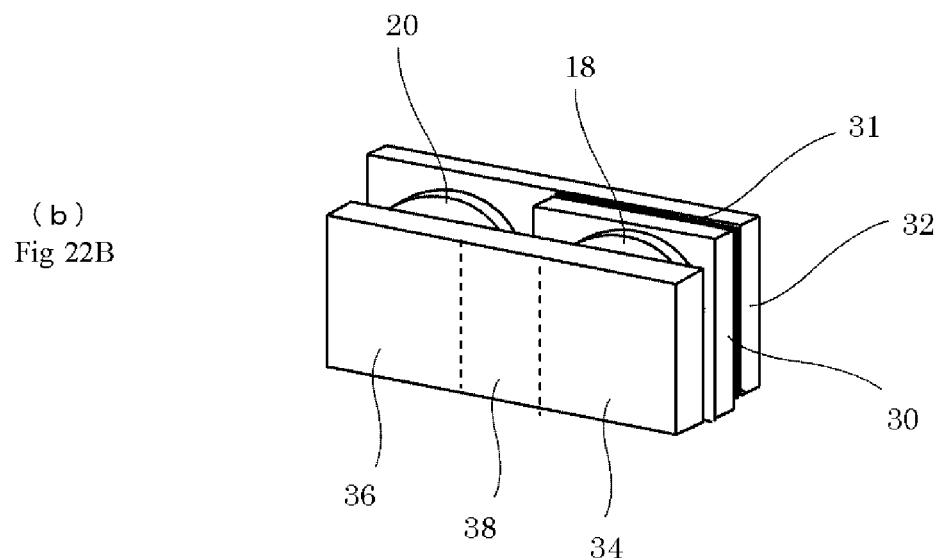
Fig 22

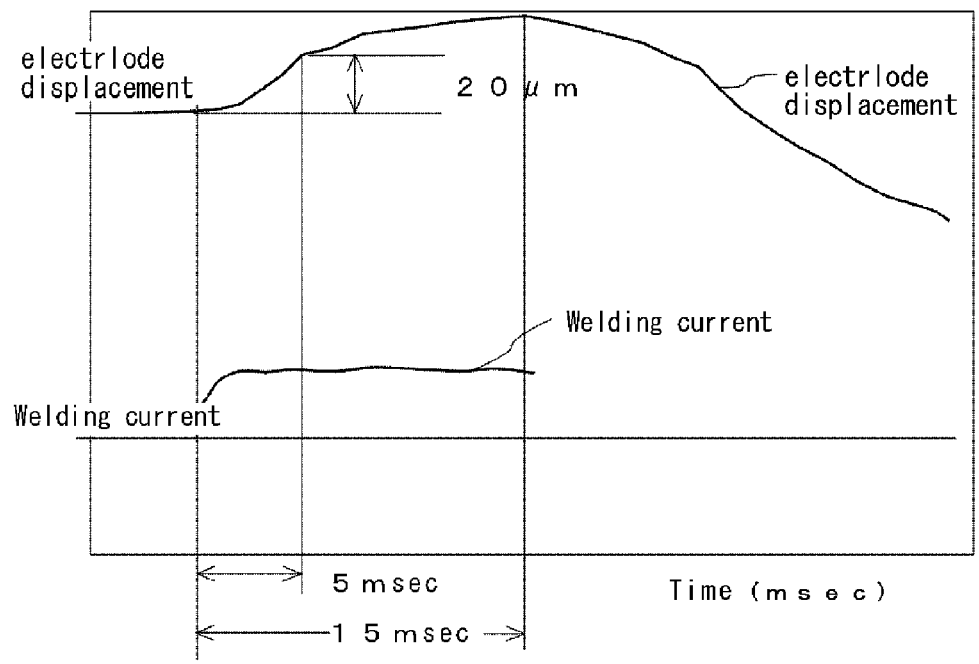
(a) Fig 26A
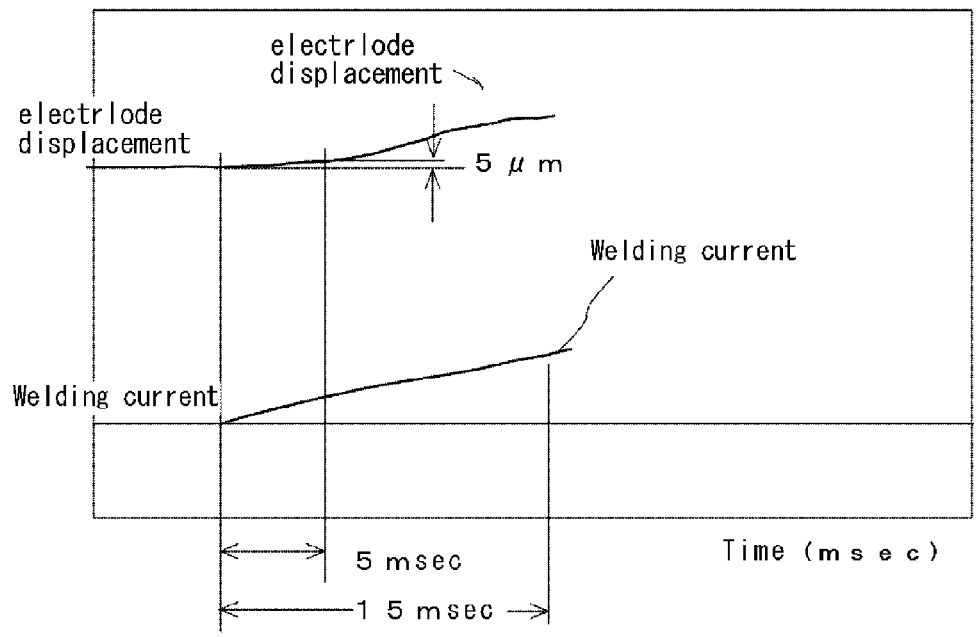
(b) Fig 26B
Fig 26

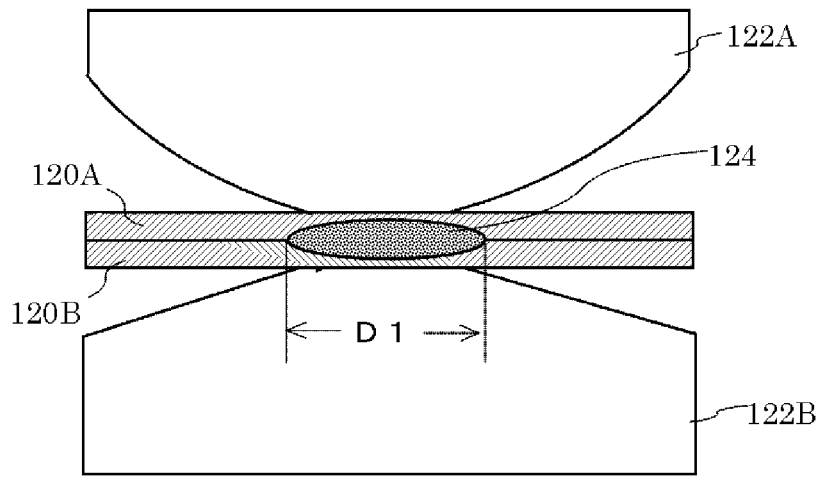
(a) Fig 27A
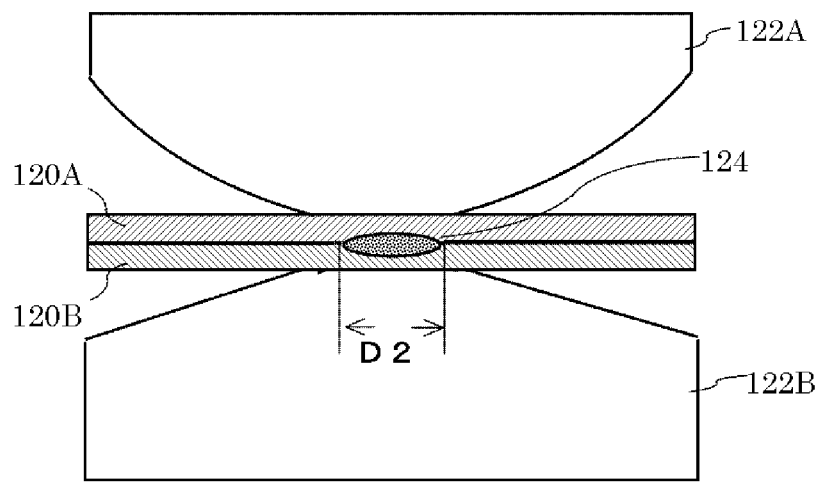
(b) Fig 27B
Fig 27

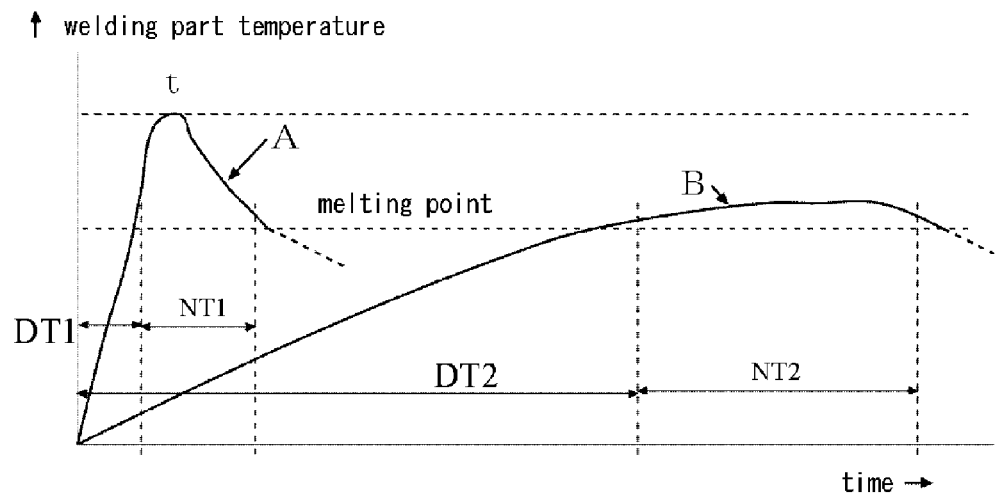
FIG31
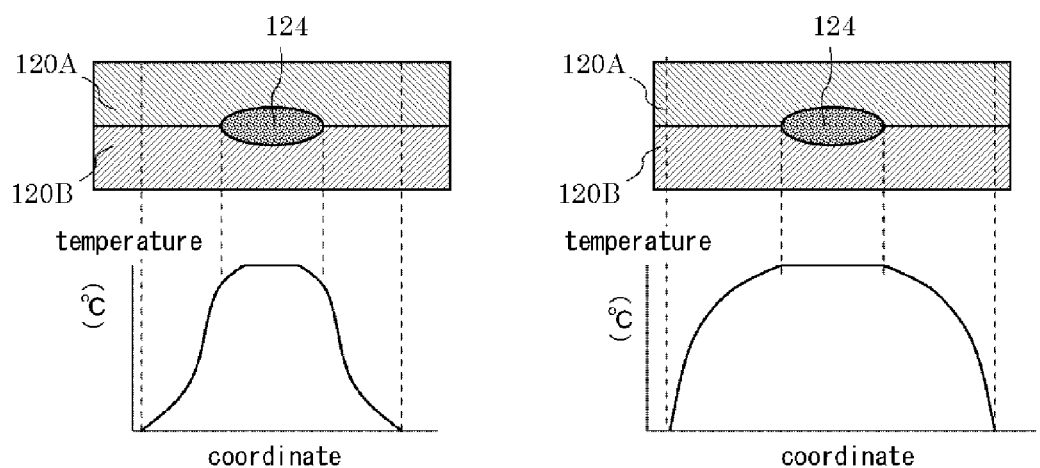
(a)
FIG32A
(b)
FIG32B
FIG32

WELDING TRANSFORMER AND WELDING TRANSFORMER ASSEMBLY AND WELDING APPARATUS

TECHNICAL FIELD

The present invention relates to a large current welding transformer, a welding transformer assembly, a welding apparatus and a resistance welding method that are respectively used in a resistance welding device and can perform welding in a high speed and a high quality.

BACKGROUND ART

The technology is known that controls a welding electric current in a high precision by performing a primary electric current control through an inverter in a welding transformer of resistance welding device (referring to a Patent document 1). Further, through devising its coil structure, a further high speed control is attempted (referring to a Patent document 1).

Resistance welding technology is widely used for the manufacture line of a car or general industries. In those industries, in order to overcome competition on a world level, improvement in productivity is indispensable.

Furthermore, development of the energy-saving technology which cuts down $CO_2$ from the viewpoint of earth-environment protection is also an urgent subject. However, the conventional resistance welding method for the steel plate with bad weld ability was presenting the aspect which moved against productivity or energy saving. The various resistance welding methods that it was suitable for such various uses are developed (referring to a Patent document 1,2,3,4).

CITATION LIST

Patent Literature

[Patent reference 1] Japan patent No. 4687930
[Patent reference 2] JPA2008-105041
[Patent reference 3] JPA2009-291827
[Patent reference 4] JPA2011-5544

SUMMARY OF INVENTION

Technical Problem

In order to perform a short time welding in a large electric current, a primary electric current control with high frequency is necessary. Further, in order to perform a high quality welding, the frequency is desired several times or several ten times higher than that of former.

However, in the former welding apparatus, there is a problem that once the frequency is raised to an above several times for the primary electric current control, the objective welding electric current cannot be obtained, or the operation becomes to be instability. Further, when a secondary coil of electric current is made to be large for a large capacity, there is a fear that an obstacle occur in the welding transformer through magnetism saturation.

FIG. 23 is the principal part sectional view of the welding part of resistance welding equipment. In resistance welding, as shown in FIG. 1, the welded material 120A and 120B, such as a piled-up steel plate, is pressurized by electrode 122A and 122B, and current is supplied. At the point of contact of the welded material 120A and 120B, a part of welded material 120A and 120B is melted by the Joule heat, and a nugget 124 is formed. The welding process adapting this method are known, they are spot welding, seam welding, etc. The calorific value of welding can be expressed with the following formulas. Quantity-of-heat=$0.24i^2$rt Meaning of Each Value in a Formula;
i; current value (unit A ampere)
r: Resistance of the material welded (unit Ω)
t: current supplied time (unit second)
If a unit is measured by Joule," 0.24 in the formula" is disappeared.
The formula is;

$$\text{Quantity-of-heat} = i^2 rt$$

For example, in resistance welding of the soft steel board, the thickness of the board is 0.8-3.2 mm, the best conditions are prescribed by RWMA (American resistance welding manufacturer association) By the RWMA, current supplied time is 160-640 msec (millimeter second) (eight to 32 cycle), and welding current is 7800-17400 A (ampere). There is steel board with thin plating in order to proof rust, and there is high-strength steel board in order to increase intensity. The boards have bad weld ability. The welded material with bad weld ability is used for many products. Current supplied time becomes longer. In the welding technology, shortening of welding time is the important subject in resistance welding of large current.

The present invention relates to a welding transformer in which a precision and high speed welding control can be performed, a large electric current can be supplied, and the consumption electric power can also be restrained by a large margin at the same time, a welding transformer assembly in which the welding transformer is used, and a welding apparatus are supplied.

In order to solve the above-mentioned subject, this invention relate to present the resistance welding method of and welding apparatus, which improve energy saving and productivity to resistance welding.

Solution to Problem

It is, therefore, respective aspects are supplied to solve the above problem.
<Aspect No. 1>
The present invention is to provide a welding transformer, comprising a primary coil 12c and a secondary coil,
wherein the primary coil 12 and the secondary coil are wound on a magnetic core 25, the secondary coil includes a positive side coil 14 and a negative side coil 16 being connected in series,
one terminal of the positive side coil 14 is connected to one terminal of a rectifier element 18, one terminal of the negative side coil 16 is connected to one terminal of a rectifier element 20, the other terminal of the rectifier element 18 and the other terminal of the rectifier element 20 are connected to a plus electrode 22 together, the other terminal of the positive side coil 14 and the other terminal of the negative side coil 16 are connected to a minus electrode 24 together, the plus electrodes 22 and minus electrodes 24 of the secondary circuit are connected to a welding apparatus 28,
primary electric current is supplied from an inverter to the primary coil 12, the primary electric current includes pulses which invert polarity alternatively of high frequency,
the primary coil 12 is sandwiched between the positive side coil 14 and the negative side coil 16,
one terminal of the positive side coil 14 is electrically connected to a first connection polar board 44 that is electrically connected to the positive side electric conductor 30, one terminal of the negative side coil 16 is electrically connected to a second connection polar board 46 that is electrically connected to the positive side electric conductor 32, the positive side electric conductor 30 and the negative side electric conductor 32 are coincided through an insulation layer 31, the rectifier element 18 is interposed between the positive side electric conductor 30 and the first polar board 34, the rectifier element 20 is interposed between the negative side electric conductor 32 and the second polar board 36, the first polar board 34 and the second polar board 36 are electrically connected to a third polar board 38, the third polar board 38 is electrically connected to a plus electrode 22, the other terminal of the positive side coil 14 and the other terminal of the negative side coil 16 are connected to a minus electrode 24.

<Aspect No. 2>

The present invention is to provide a welding transformer stated in the aspect No. 1, wherein plural positive side coils 14 and plural negative side coils 16 are alternately arranged, the primary coil 12 is divided into plural parts, and the plural parts are inserted between the positive side coils 14 and the negative side coils 16, the plural parts of the a primary coil 12 are serial connected or partially parallel connected, the positive side coils 14 are parallel connected or partially serial connected, the negative side coils 16 are parallel connected or partially serial connected, the positive side coils 14 and the negative side coils 16 are serial connected, one terminal of the positive side coils 14 is connected to the first connection polar board 44, one terminal of the negative side coils 16 is connected to the second connection polar board 46, the other terminal of the positive side coils 14 and the other terminal of the negative side coils 16 are connected to the third connection polar board 48.

<Aspect No. 3>

The present invention is to provide a welding transformer stated in the aspect No. 2, wherein the primary coil 12 is divided into plural parts, and wound on the magnetic core 25, the plural positive side coils 14 and the plural negative side coils 16 are alternately inserted between the plural parts.

<Aspect No. 4>

The present invention is to provide a welding transformer stated in the aspect No. 3, wherein a one turn coil that cuts and processes copperplate in C word shape, is two connected in series to be used in the secondary coil.

<Aspect No. 5>

The present invention is to provide a welding transformer stated in the aspect No. 1, wherein the negative side coil 16 and the primary coil 12 and the positive side coil 14 are coaxial rolled to be overlapped on the magnetic core 25, or the positive side coil 14 and the primary coil 12 and the negative side coil 16 are coaxial rolled to be overlapped on the magnetic core 25, <Aspect No. 6>

The present invention is to provide a welding transformer stated in the aspect No. 1, wherein the first unit comprises the negative side coil 16 and the primary coil 12 and the positive side coil 14 are coaxial rolled to be overlapped on the magnetic core 25, the second unit comprises the positive side coil 14 and the primary coil 12 and the negative side coil 16 are coaxial rolled to be overlapped on the magnetic core 25, the first unit and the second unit alternatively are arranged without a gap on the magnetic core.

<Aspect No. 7>

The present invention is to provide a welding transformer that has a primary coil and secondary coil wherein high frequency AC electric current is input to the primary coil, and DC welding electric current is output through a rectifying device from the secondary coil comprising:

a loop magnetic core 25 that is constructed from paralleling sections 25a and winding sections 25b of U-word shape on both ends;

the primary coil 12 that is wound on the paralleling section 25a of the loop magnetic core 25 and is divided into plural parts by making gaps 12a;

the secondary coil that is wound on the paralleling section 25a of the loop magnetic core 25 together with the primary coil 12 and has plural positive side coils 14 and plural negative side coils 16 that are alternately arranged in the respective gaps 12a; and a contact base member 62 that has an electric conductor group to electrically connecting terminals of the positive side coil 14 and the negative side coil 16 so that the plural positive side coils 14 are all connected in parallel, or, the whole or a part of the plural positive side coils 14 are connected in series; so that the plural negative side coils 16 are all connected in parallel, or, the whole or a part of the negative side coils 16 are connected in series; and so that the connected plural positive side coils 14 and the connected plural negative side coils 16 are mutually connected in series through the electric conductor group of a contact base member 62, and the contact base member 62 supports and fixes all the positive side coils 14 and the negative side coils 16 on one surface of it, wherein one terminal of the plural positive side coils 14 is electrically connected to a first connection polar board 44 that extends along a direction parallel with the paralleling section 25a of the loop magnetic core 25 on other surface of the contact base member 62;

one terminal of the plural negative side coils 16 is electrically connected to a second connection polar board 46 that extends along the direction parallel with the paralleling section 25a of the loop magnetic core 25 on the other surface of the contact base member 62;

other terminals of the positive side coil 14 and the negative side coil 16 are together electrically connected to a third connection polar board 48 that extends along the direction parallel with the paralleling section 25a of the loop magnetic core 25 on the other surface of the contact base member 62;

on the first connection polar board 44, a positive side electric conductor 30 is connected;

on the second connection polar board 46, a negative side electric conductor 32 is connected;

the positive side electric conductor 30 and the negative side electric conductor 32 are a pair of electric conductor boards that are coincided through an insulation layer 31 that is arranged on the interface extending along a direction that is perpendicularly separate from the other surface of the contact base member 62; and the pair of electric conductor boards, include:

a rectifying device 18 that makes the positive side electric conductor 30 touch negative pole and makes a first polar board 34 touch positive pole by sandwiching it between the positive side electric conductor 30 and the first polar board 34;

a rectifying device 20 that makes the negative side electric conductor 32 touch negative pole and makes a second polar board 36 touch positive pole by sandwiching it between the negative side electric conductor 32 and the second polar board 36; and a third polar board 38 that supports the first polar board 34 and the second polar board 36, and then electrically connects the both.

<Aspect No. 8>

The present invention is to provide a welding transformer that has a primary coil and secondary coil wherein high frequency AC electric current is input to the primary coil, and DC welding electric current is output through a rectifying device from the secondary coil comprising:

a loop magnetic core 25 that is constructed from a paralleling section 25a and a winding section 25b of the U-word shape of the both ends;

a part that is alternately interactive inseparably arranged a first coil unit that is coaxial rolled so as to collocate a negative side coil 16 in the center, collocate the primary coil 12 on the above, and collocate a positive side coil 14 on the above periphery, with a second coil unit that is coaxial rolled so as to collocate a positive side coil 14 in the center, collocate the primary coil 12 on the above, and collocate a negative side coil 16 on the above periphery; and a contact base member 62 that has an electric conductor group to electrically connecting terminals of the positive side coil 14 and the negative side coil 16 so that the plural positive side coils 14 are all connected in parallel, or, the whole or a part of the plural positive side coils 14 are connected in series; so that the plural negative side coils 16 are all connected in parallel, or, the whole or a part of the negative side coils 16 are connected in series; and so that the connected plural positive side coils 14 and the connected plural negative side coils 16 are mutually connected in series through the electric conductor group of a contact base member 62, and the contact base member 62 supports and fixes all the positive side coils 14 and the negative side coils 16 on one surface of it, wherein one terminal of the plural positive side coils 14 is electrically connected to a first connection polar board 44 that extends along a direction parallel with the paralleling section 25a of the loop magnetic core 25 on other surface of the contact base member 62;

one terminal of the plural negative side coils 16 is electrically connected to a second connection polar board 46 that extends along the direction parallel with the paralleling section 25a of the loop magnetic core 25 on the other surface of the contact base member 62;

other terminals of the positive side coil 14 and the negative side coil 16 are together electrically connected to a third connection polar board 48 that extends along the direction parallel with the paralleling section 25a of the loop magnetic core 25 on the other surface of the contact base member 62;

on the first connection polar board 44, a positive side electric conductor 30 is connected;

on the second connection polar board 46, a negative side electric conductor 32 is connected;

the positive side electric conductor 30 and the negative side electric conductor 32 are a pair of electric conductor boards that are coincided through an insulation layer 31 that is arranged on the interface extending along a direction that is perpendicularly separate from the other surface of the contact base member 62; and the pair of electric conductor boards, include:

a rectifying device 18 that makes the positive side electric conductor 30 touch negative pole and makes a first polar board 34 touch positive pole by sandwiching it between the positive side electric conductor 30 and the first polar board 34;

a rectifying device 20 that makes the negative side electric conductor 32 touch negative pole and makes a second polar board 36 touch positive pole by sandwiching it between the negative side electric conductor 32 and the second polar board 36; and a third polar board 38 that supports the first polar board 34 and the second polar board 36, and then electrically connects the both.

<Aspect No. 9>

The present invention is to provide the stated welding transformer of the aspect No. 7 or 8, wherein the contact base member 62 has a hole part, and the hole part constructs a refrigerant route.

<Aspect No. 10>

The present invention is to provide the stated welding transformer of the aspect No. 9, wherein anyone of the positive side coil 14, the negative side coil 16 and the contact base member 62 have a hole part, and respective parts are connected in plumbing, and then a refrigerant route is constructed.

<Aspect No. 11>

The present invention is to provide the stated welding transformer of the aspect No. 7, wherein the contact base member forms a section L-word shape so as to support two side surfaces of the coil group on a condition to sandwich the positive side coil 14 and the negative side coil 16 into a gap 12a of the primary coil 12 per one.

<Aspect No. 12>

The present invention is to provide a welding transformer assembly, comprising:

at least two welding transformers stated in anyone of the aspect No. 1 to No. 11.

<Aspect No. 13>

The present invention is to provide a welding transformer assembly stated in the aspect No. 12, wherein, by combining over the stated two welding transformers, the paralleling section 25a of the loop magnetic core 25 of respective welding transformers becomes mutually parallel, a surface that is parallel with a surface extending along a direction that is perpendicularly separate from the other surface of the contact base member 62 is opposite, respective plus electrodes 22 that are connected to respective third polar boards 38 of respective welding transformers, are connected and fixed through a commonness plus electrode 64, and respective minus electrodes 24 of the stated respective welding transformers are connected and fixed through a commonness minus electrode 66.

<Aspect No. 14>

In the welding transformer assembly stated in the aspect No. 12, the plus electrode 22, the minus electrode 24, the third polar board 38, and a refrigerant supply mouth are arranged on the two side outside surfaces that are parallel with a surface extending along a direction that is perpendicularly separate from the other surface of the contact base member 62.

<Aspect No. 15>

The present invention is to provide a welding apparatus, comprising a welding transformer stated in anyone of the aspect No. 1 to No. 11.

<Aspect No. 16>

The present invention is to provide a welding transformer that has a primary coil and secondary coil wherein High frequency AC electric current is input to a primary coil, and DC welding electric current is output through a rectifying device from a secondary coil comprising:

welding control power supply equipment, the welding transformer, the main part of a resistance welding machine, the memory storage which memorized the welding condition database, pair of electrode which supply welding current to the piled-up welding material and the mechanism which give pressure to the welding material and the electrodes, wherein:

the welding control power supply equipment supplies welding current to the welding material through the pair of electrodes, using the data which specifies the level and supply timing of welding current being read from the welding condition database memorized by the above-mentioned memory storage, the control term T1 is a term from the welding current supply start time t0 to the subsequent time t1, the current rate of increase is greatest in the term, the peak level control term T2 is a term from the time t1 to time t2, the current revel is maintained near the peak current value C1, temperature maintenance control term T3 is a term from the time t2 to the current interception time t3, the welding control power supply equipment makes the starting control term T1 below a 10 mm second, and the sum of the starting control term T1 and the peak level control term T2, which is (T1+T2), below a 15 mm second of controlling the above-mentioned welding current to carry out.

<Aspect No. 17>

The present invention is to provide a welding transformer that has a primary coil and secondary coil wherein High frequency AC electric current is input to a primary coil, and DC welding electric current is output through a rectifying device from a secondary coil comprising:

welding control power supply equipment, the welding transformer, the main part of a resistance welding machine, the memory storage which memorized the welding condition database, pair of electrode which supply welding current to the piled-up welding material and the mechanism which give pressure to the welding material and the electrodes, a loop magnetic core 25 that is constructed from paralleling sections 25a and winding sections 25b of U-word shape on both ends;

a primary coil 12 that is wound on the paralleling section 25a of the loop magnetic core 25 and is divided into plural parts by making gaps 12a;

a secondary coil that is wound on the paralleling section 25a of the loop magnetic core 25 together with the primary coil 12 and has plural positive side coils 14 and plural negative side coils 16 that are alternately arranged in the respective gaps 12a; and a contact base member 62 that has an electric conductor group to electrically connecting terminals of the positive side coil 14 and the negative side coil 16 so that the plural positive side coils 14 are all connected in parallel, or, the whole or a part of the plural positive side coils 14 are connected in series; so that the plural negative side coils 16 are all connected in parallel, or, the whole or a part of the negative side coils 16 are connected in series; and so that the connected plural positive side coils 14 and the connected plural negative side coils 16 are mutually connected in series, and that supports and fixes all the positive side coils 14 and the negative side coils 16 on one surface through the electric conductor group through the electric conductor group of a contact base member 62, and the contact base member 62 supports and fixes all the positive side coils 14 and the negative side coils 16 on one surface of it, wherein one terminal of the plural positive side coils 14 is electrically connected to a first connection polar board 44 that extends along a direction parallel with the paralleling section 25a of the loop magnetic core 25 on other surface of the contact base member 62;

one terminal of the plural negative side coils 16 is electrically connected to a second connection polar board 46 that extends along the direction parallel with the paralleling section 25a of the loop magnetic core 25 on the other surface side of the contact base member 62;

other terminals of the positive side coil 14 and the negative side coil 16 are together electrically connected to a third connection polar board 48 that extends along the direction parallel with the paralleling section 25a of the loop magnetic core 25 on the other surface side of the contact base member 62;

on the first connection polar board 44, a positive side electric conductor 30 is connected;

on the second connection polar board 46, a negative side electric conductor 32 is connected;

the positive side electric conductor 30 and the negative side electric conductor 32 are a pair of electric conductor boards that are coincided through an insulation layer 31 that is arranged on the interface extending along a direction that is perpendicularly separate from the other surface of the contact base member 62; and the pair of electric conductor boards, include:

a rectifying device 18 that makes the positive side electric conductor 30 touch negative pole and makes a first polar board 34 touch positive pole by sandwiching it between the positive side electric conductor 30 and the first polar board 34;

a rectifying device 20 that makes the negative side electric conductor 32 touch negative pole and makes a second polar board 36 touch positive pole by sandwiching it between the negative side electric conductor 32 and the second polar board 36; and a third polar board 38 that supports the first polar board 34 and the second polar board 36, and then electrically connects the both.

the welding control power supply equipment supplies welding current to the welding material through the pair of electrodes, using the data which specifies the level and supply timing of welding current being read from the welding condition database memorized by the above-mentioned memory storage, the control term T1 is a term from the welding current supply start time t0 to the subsequent time t1, the current rate of increase is greatest in the term, the peak level control term T2 is a term from the time t1 to time t2, the current revel is maintained near the peak current value C1, temperature maintenance control term T3 is a term from the time t2 to the current interception time t3, the welding control power supply equipment makes the starting control term T1 below a 10 mm second, and the sum of the starting control term T1 and the peak level control term T2, which is (T1+T2), below a 15 mm second of controlling the above-mentioned welding current to carry out.

<Aspect No. 18>

The present invention is to provide a welding transformer that has a primary coil and secondary coil wherein High frequency AC electric current is input to a primary coil, and DC welding electric current is output through a rectifying device from a secondary coil comprising:

welding control power supply equipment, the welding transformer, the main part of a resistance welding machine, the memory storage which memorized the welding condition database, pair of electrode which supply welding current to the piled-up welding material and the mechanism which give pressure to the welding material and the electrodes, a loop magnetic core 25 that is constructed from a paralleling section 25*a* and a winding section 25*b* of the U-word shape of the both ends;

a part that is alternately interactive inseparably arranged a first coil unit that is coaxial rolled so as to collocate a negative side coil 16 in the center, collocate a primary coil 12 on the above, and collocate a positive side coil 14 on the above periphery, with a second coil unit that is coaxial rolled so as to collocate a positive side coil 14 in the center, collocate a primary coil 12 on the above, and collocate a negative side coil 16 on the above periphery; and a contact base member 62 that has an electric conductor group to electrically connecting terminals of the positive side coil 14 and the negative side coil 16 so that the plural positive side coils 14 are all connected in parallel, or, the whole or a part of the plural positive side coils 14 are connected in series; so that the plural negative side coils 16 are all connected in parallel, or, the whole or a part of the negative side coils 16 are connected in series; and so that the connected plural positive side coils 14 and the connected plural negative side coils 16 are mutually connected in series, and that supports and fixes all the positive side coils 14 and the negative side coils 16 on one surface through the electric conductor group through the electric conductor group of a contact base member 62, and the contact base member 62 supports and fixes all the positive side coils 14 and the negative side coils 16 on one surface of it, wherein one terminal of the plural positive side coils 14 is electrically connected to a first connection polar board 44 that extends along a direction parallel with the paralleling section 25*a* of the loop magnetic core 25 on other surface of the contact base member 62;

one terminal of the plural negative side coils 16 is electrically connected to a second connection polar board 46 that extends along the direction parallel with the paralleling section 25*a* of the loop magnetic core 25 on the other surface side of the contact base member 62;

other terminals of the positive side coil 14 and the negative side coil 16 are together electrically connected to a third connection polar board 48 that extends along the direction parallel with the paralleling section 25*a* of the loop magnetic core 25 on the other surface side of the contact base member 62;

on the first connection polar board 44, a positive side electric conductor 30 is connected;

on the second connection polar board 46, a negative side electric conductor 32 is connected;

the positive side electric conductor 30 and the negative side electric conductor 32 are a pair of electric conductor boards that are coincided through an insulation layer 31 that is arranged on the interface extending along a direction that is perpendicularly separate from the other surface of the contact base member 62; and the pair of electric conductor boards, include:

a rectifying device 18 that makes the positive side electric conductor 30 touch negative pole and makes a first polar board 34 touch positive pole by sandwiching it between the positive side electric conductor 30 and the first polar board 34;

a rectifying device 20 that makes the negative side electric conductor 32 touch negative pole and makes a second polar board 36 touch positive pole by sandwiching it between the negative side electric conductor 32 and the second polar board 36; and a third polar board 38 that supports the first polar board 34 and the second polar board 36, and then electrically connects the both.

the welding control power supply equipment supplies welding current to the welding material through the pair of electrodes, using the data which specifies the level and supply timing of welding current being read from the welding condition database memorized by the above-mentioned memory storage, the control term T1 is a term from the welding current supply start time t0 to the subsequent time t1, the current rate of increase is greatest in the term, the peak level control term T2 is a term from the time t1 to time t2, the current revel is maintained near the peak current value C1, temperature maintenance control term T3 is a term from the time t2 to the current interception time t3, the welding control power supply equipment makes the starting control term T1 below a 10 mm second, and the sum of the starting control term T1 and the peak level control term T2, which is (T1+T2), below a 15 mm second of controlling the above-mentioned welding current to carry out.

<Aspect No. 19>

The present invention is to provide the stated welding transformer of the aspect No. 17 or 18, wherein the contact base member 62 has a hole part, and the hole part constructs a refrigerant route.

<Aspect No. 20>

The present invention is to provide the stated welding transformer of the aspect No. 19, wherein anyone of the positive side coil 14, the negative side coil 16 and the contact base member 62 have a hole part, and respective parts are connected in plumbing, and then a refrigerant route is constructed.

<Aspect No. 21>

The present invention is to provide the stated welding transformer of the aspect No. 17 or 18, wherein the contact base member forms a section L-word shape so as to support two side surfaces of the coil group on a condition to sandwich the positive side coil 14 and the negative side coil 16 into a gap 12*a* of the primary coil 12 per one.

<Aspect No. 22>

The present invention is to provide a welding transformer assembly stated in the aspect No. 21, wherein, by combining over the stated two welding transformers, the paralleling section 25*a* of the loop magnetic core 25 of respective welding transformers becomes mutually parallel, a surface that is parallel with a surface extending along a direction that is perpendicularly separate from the other surface of the contact base member 62 is opposite, respective plus electrodes 22 that are connected to respective third polar boards 38 of respective welding transformers, are connected and fixed through a commonness plus electrode 64, and respective minus electrodes 24 of the stated respective welding transformers are connected and fixed through a commonness minus electrode 66.

<Aspect No. 23>

In the welding transformer assembly stated in the aspect No. 22, the plus electrode 22, the minus electrode 24, the third polar board 38, and a refrigerant supply mouth are arranged on the two side outside surfaces that are parallel with a surface extending along a direction that is perpendicularly separate from the other surface of the contact base member 62.

<Aspect No. 24>

The present invention is to provide a resistance welding method characterized by controlling the welding current, wherein a term from the time t0 to t1 is referred to as term T1, the time t0 is time of stating the welding current, the term T1 is starting control part of the maximum increase rate of the welding current, a term from the time t2 to t3 is referred to as term T2, the term T2 is peak revel control part which maintains the current of predetermined level near the peak current value C1, a term from the time t2 to the time t3 is referred to as term T3, the time t3 is the current interception time and the term T3 is temperature maintenance control pert, the starting control term T1 is below the 10 mm second and the sum (T1+T2) of the starting control term T1 and the peak level control term T2 is below the 15 mm second.

<Aspect No. 25>

The present invention is to provide a resistance welding method of the aspect 24 characterized by controlling the welding current, wherein the sum (T1+T2+T3) of the starting control term T1, the peak level control term T2, and the temperature maintenance control term T3 is below 50 mm second.

<Aspect No. 26>

The present invention is to provide a resistance welding method of the aspect 24 characterized by controlling the welding current, wherein a sum (T1+T2) of the starting control term T1 and the peak level control term T2 is below 5 mm second, a sum (T1+T2+T3) of the starting control term T1, the peak level control term T2 and the temperature maintenance control term T3 is below 20 mm second.

<Aspect No. 27>

The present invention is to provide a resistance welding method of the aspect 25 or 26 characterized by controlling the welding current, wherein from the starting control term T1 to the peak level control term T2, it control the maximum current which make temperature of welding part to more than melting point and below permissible value, and it dwindle the current until the nugget of suitable size is formed.

<Aspect No. 28>

The present invention is to provide a resistance welding method of the aspect 27 characterized by controlling the welding current, wherein the welding current gradually progress from the welding current value after the peak level control term T2 to the end value of the welding current in the current interception time t3.

<Aspect No. 29>

The present invention is to provide a resistance welding method characterized by controlling the welding current in early stages of welding so that welding current becomes maximum level from current supply start within a 5 mm second, and ending welding in current supply below a 50 mm second from current supply start of the welding current.

Advantageous Effects of Invention

<Effect of Aspect No 1>

Because it is to be arranged to make the positive side electric conductor 30 and the negative electric conductor 32 stick firmly through the insulation layer, and to sandwich the primary coil 12 between the positive side coil 14 and the negative side coil 16, it becomes possible to reduce inductance of the commutation of the secondary circuit, to reduce the commutation time, and to perform an inverter control of a high frequency.

<Effect of Aspect No 2>

By dividing and rolling the primary coil 12, the positive side coil and the negative side coil of the secondary side, the bond between primary coil and secondary coil becomes well, it is possible to prevent the magnetism saturation through large electric current of secondary side.

<Effect of Aspect No 3>

Even in the case of the relation of the primary coil 12, the positive side coil 14 and the negative side coil 16, it is possible to make them closely mutually related in equality.

<Effect of Aspect No 4>

As the positive side coil and the negative side coil are one turn coil, it becomes possible to reduce inductance and easy to dividing and rolling the coils.

<Effect of Aspect No 5 and 6>

When the positive side coil and the negative side coil are rolled coaxially, similar effect is obtained as effect No. 1 to 4.

<Effect of Aspect No 7>

(1) Because it is to be arranged to make the positive side electric conductor 30 and the negative electric conductor 32 stick firmly through the insulation layer, and to sandwich the primary coil 12 between the positive side coil 14 and the negative side coil 16, it becomes possible to reduce inductance of the commutation of the secondary circuit, to reduce the commutation time, and to perform an inverter control of a high frequency.

(2) Because it is to be arranged to sandwich respective divided and rolled parts of the primary coil 12 between the plural positive side coils 14 and the plural negative side coils 16, the heat distribution of the whole transformer becomes uniform.

(3) By dividing and rolling the primary coil 12, the positive side coil and the negative side coil of the secondary side, the bond between primary coil and secondary coil becomes well, it is possible to prevent the magnetism saturation through large electric current of secondary side.

(4) Even in the case of the relation of the primary coil 12, the positive side coil 14 and the negative side coil 16, it is possible to make them closely mutually related in equality.

<Effect of Aspect No 8>

The refrigerant is supplied to the hole part, the positive side coil 14 and the negative side coil 16 are cooled. Because it is to be arranged to sandwich respective divided and rolled parts of the primary coil 12 between the plural positive side coils 14 and the plural negative side coils 16, it is possible to efficiently cool the whole transformer including the primary coil 12 through the positive side coil 14 and the negative side coil 16.

<Effect of Aspect No. 9 and 10>

The positive side coil 14, the negative side coil 16 and the contact base member 62 are fully cooled through the refrigerant.

<Effect of Aspect No. 11>

The intensity is improved through the contact base member that is formed in section L-word shape, the cooled efficiency also becomes well.

<Effect of Aspect No. 13 to 14>

Because on one side of the contact base member 62, the primary coil 12, the positive side coil 14 and the negative side coil 16 are arrange, on the other side of the contact base member 62, the polar board for the electricity connection and the rectifying device are arranged, it is possible to keep the whole in the thickness of the coil part. Therefore, it is possible to connect plural transformers through the commonness plus electrode 64 or the commonness minus electrode 66, and to assemble arbitrary large capacity of welding transformer.

<Effect of Aspect No. 16 to 18>

Good welding quality can be carried out even if it shortens current supply time. A miniaturization of a welding transformer, the durability of electrode and the simplification of a cooling device bring realized the energy saving and productivity.

<Effect of Aspect No. 24>

As the welding current in early stages of welding is started for a short time, saving of the amount of supply electric power can be performed.

<Effect of Aspect No. 15>

As the welding current in early stages of welding is started for a short time, the time for nugget formation can be shortened more.

<Effect of Aspect No. 26>

Total welding time can be shortening extremely.

<Effect of Aspect No. 27>

Shortening the welding time collectively, and supplying the greatest welding current in early stages, and dwindling welding current gradually, the current control becomes easy comparatively.

<Effect of Aspect No. 28>

As the welding current dwindle gradually, it made easy to control welding temperature.

<Effect of Aspect No. 29>

Good welding quality can be carried out even if it shortens current supply time. A miniaturization of a welding transformer, the durability of electrode and the simplification of a cooling device bring realized the energy saving and productivity.

The above and other objects and features of the present invention will become apparent from the following detailed description and the appended claims with reference to the accompanying drawings.

BRIEF DESCRIPTION OF DRAWINGS

FIG. 13 is a sideways diagram of positive side coil 14, negative side coil 16 and contact base member 62;

FIG. 14 is a disjoint sideways diagram of a first connection polar board 44, a second connection polar board 46, and a third connection polar board 48 and so on;

FIG. 22 is a main part sideview diagram showing a change example of an arrangement of the rectifying device;

FIG. 26 is a diagram of change of welding current and electrode displacement;

FIG. 27 is a welding part of sectional view showing the state of the nugget;

FIG. 31 is a comparison diagram of the temperature change of the central part of the welding part;

FIG. 32 is a comparison diagram of a temperature distribution of the nugget circumference;

DESCRIPTION OF EMBODIMENTS

Embodiments of the present invention will be described in detail hereinbelow with reference to the drawings.

Figure 1:
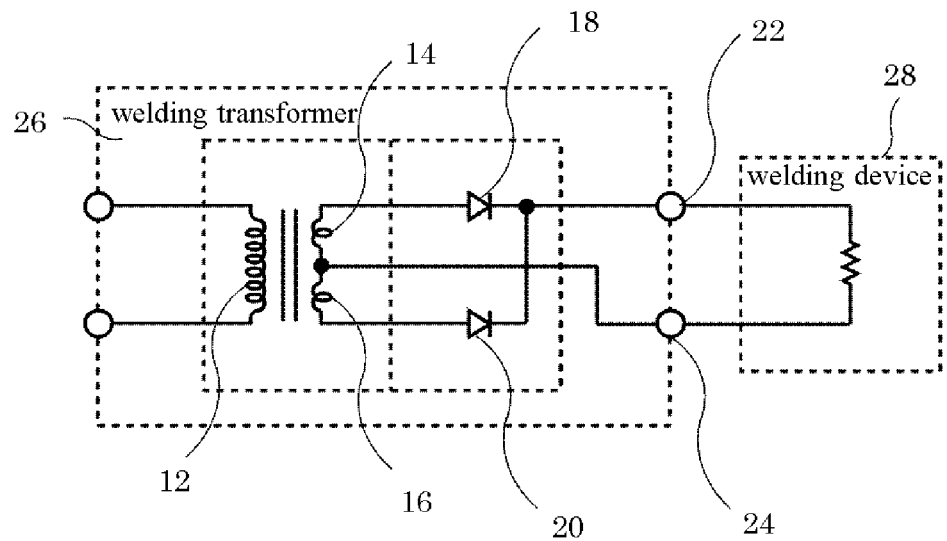
FIG. 1 is a circuit's diagram of an electric source circuit of a welding apparatus that is adopted in the present invention.

FIG. 1 is a circuit diagram of an electric source circuit of a welding apparatus that is adopted in the present invention.

Figure 4:
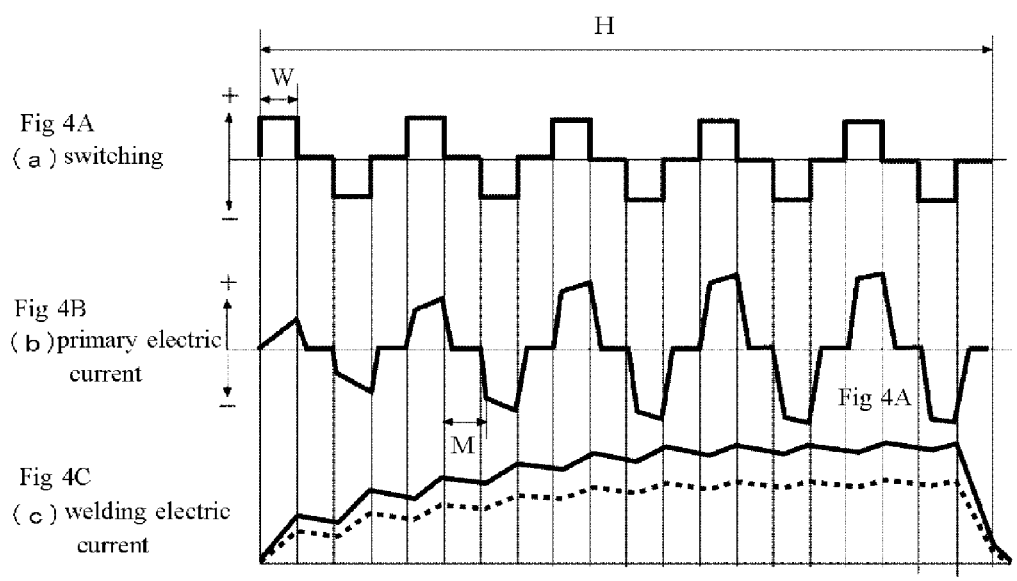
FIG. 4A represents a control pulse for controlling electric current that is supplied to primary side of transformer.
FIG. 4B represents primary electric current.
FIG. 4C represents welding electric current after the rectification.

In the primary coil 12 of the welding transformer 26, primary electric current is supplied that is explained by using FIG. 4 later. The rectifier circuit adopts single-phase full wave rectifier type. The circuit itself is well known. Although it is unnecessary to consider the polarity of the secondary coil itself, for convenience, it is decided to call secondary coil, namely, the positive side coil 14 and the negative side coil 16 series connection. One side of the rectifying device 18 is connected to the positive side coil 14, one side of the rectifying device 20 is connected to the negative side coil 16, and the other side of the rectifying device 18 and the other side of the rectifying device 20 are connected to the rectifying device 20 completely. The other side of the positive side coil and the other side of the negative side coil are connected through a connection point, but the connection point is connected to the minus electrode 24. The plus electrode 22 and the minus electrode 24 are connected through a welding device 28.

Figure 2:
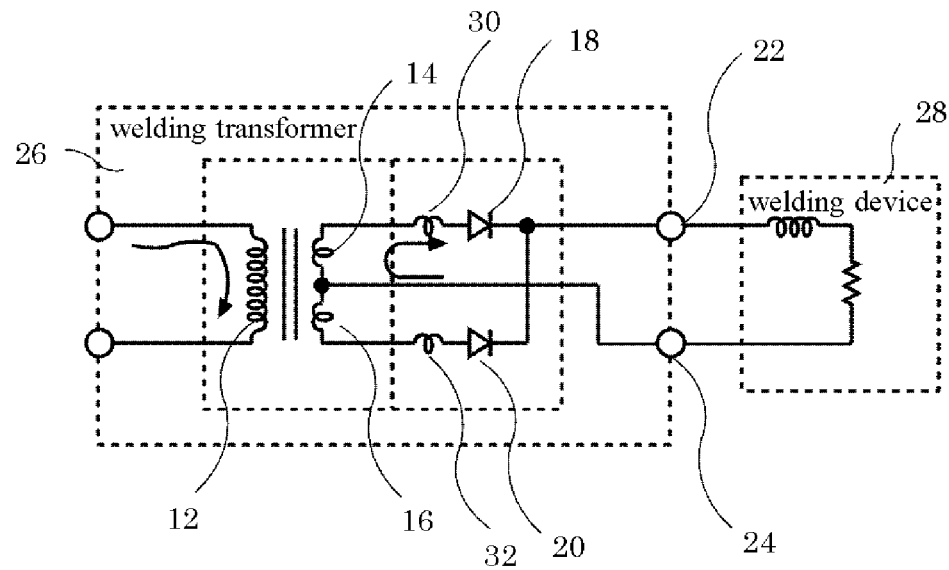
FIG. 2 is a circuits diagram for representing a circuit operation when right direction electric current follows with rectifying device 18.
Figure 3:
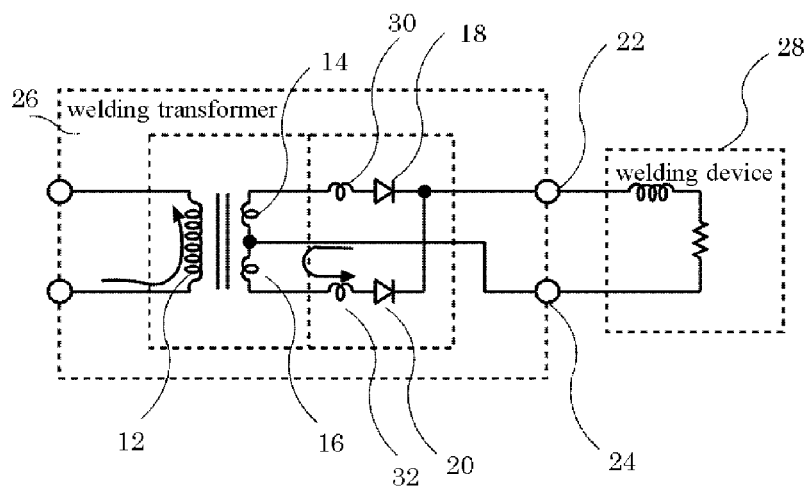
FIG. 3 is a circuits diagram for representing a circuit operation when right direction electric current follows with rectifying device 20.

FIG. 2 is a circuits diagram for representing a circuit operation when right direction electric current follows with rectifying device 18; and FIG. 3 is a circuits diagram for representing a circuit operation when right direction electric current follows with rectifying device 20.

It is to additionally write an inductance composition of equal value that becomes a problem in circuit operation. That is, it is considered that a positive side electric conductor 30 connecting the negative side coil 14 and the rectifying device 18, a negative side electric conductor 32 connecting the negative side coil 16 and the rectifying device 20, and an inductance of the electric conductor in the welding device 28, are affected in function of the welding apparatus. It is to explain the detail later.

If it is possible to restrain occurrence of a great quantity of heat occurring in the welding transformer 26 and the welding device 28, it is possible to seek to save energy of the welding apparatus. If the welding time is also shortened by controlling supplying the large electric current to a short time welding section in the former, it is possible to expect a large saving electric effect.

On the other hand, in order to supply an optimum welding electric current to the material and the structure and the like that are welted, it is necessary to extremely control a supply time of the welding electric current.

For this, an inverter is connected to primary side of the transformer that supplies the welding electric current; it is performed to control largeness and supply time of the welding electric current through a PWM control.

FIG. 4A represents a control pulse for controlling electric current that is supplied from the inverter to primary side of transformer, FIG. 4B represents primary electric current, and FIG. 4C represents welding electric current after the rectification.

Several pulses of width W which are controlled by the inverter (not shown), are supplied to the primary coil 12 of the transformer (FIG. 1) in a constant time H. The pulses include total ten times of positive pulse and negative pulse. The result is that in the primary coil 12, the electric current flows as shown by B. By full-wave rectifying on secondary side of the transformer, the welding electric current is made to occur as shown by C.

After the width W of the pulse is increased and decreased that is shown by A, it is possible to adjust the welding electric current. If the supply times of the pulse are increased and decreased, it is possible to adjust the welding time. After repetition frequency of the pulse is made to be high, it is possible to more slightly adjust the welding time. If the electric power is increased that is supplied to the primary coil, it is possible to take out a larger welding electric current from the secondary coil.

The former welding apparatus, for example, supplies welding electric current of 200 m second~700 m second in one ten thousand ampere. However, the welding electric current is regarded as two ten thousand ampere of the two times. In the welding apparatus, the electric power loss is extremely large that is consumed by becoming heat energy on the place of the welding section outside. Therefore, after by making the welding electric current two times, the welding time is shortened to one-tenth, it is possible to make the consumed electric power one-fifth. Thus, the welding quality, that is equal to the former welding quality in one ten thousand ampere, becomes possible.

On the other hand, in the control pulse of the inverter for supplying the welding electric current through the primary coil of the transformer, the repetition frequency was one kHz degree. However, for short time supplying large electric current, higher resolution ability is necessary. It is desirable that the repetition frequency is 5 kHz~50 kHz degree.

Like this, in the case to supply the pulse of the repetition frequency from the former several times to several ten times to the primary coil, in the welding transformer of the former structure, it is understood that the scheduled welding electric current cannot be obtained. That is, for outputting the large electric current from secondary coil in the control like this, different kinds of improvements are demanded in the structure of the transformer.

The secondary circuit of the full wave rectifier type using two rectifying devices 18 and 20 as shown by FIG. 1, comparing with the circuit using a bridge, the rectifying device number is few, because it is possible to be a miniaturization, and the electric power loss is also little, is applied to the welding apparatus which is known.

However, in the circuit, through a polarity reversal of the electric current that flows in the primary coil 12, when an electric voltage that is caused by the secondary coil, polarity reverses, the load electric current that is supplied through the rectifying device of one side, changes a flow in the rectifying device side of the other side, a translocation occurs.

After the welding electric current becomes large electric current, the electric current energy that is accumulated in the inductance of circuit respective parts, becomes large extremely. The electric current is moved from the rectifying device of one side to the rectifying device of the other side, and the commutation time, the inductance of respective parts of the secondary coil that is shown by FIG. 2 and FIG. 3 is larger, becomes longer.

If the translocation of the secondary circuit is not completed in the intermediate of time M from a start of the electric current of the primary coil shown by FIG. 4B to a completion of the electric current of the opposite polarity, the start of the secondary electric current is late, as shown by a broken line of FIG. 4C, the scheduled welding electric current cannot be obtained.

Figure 5:
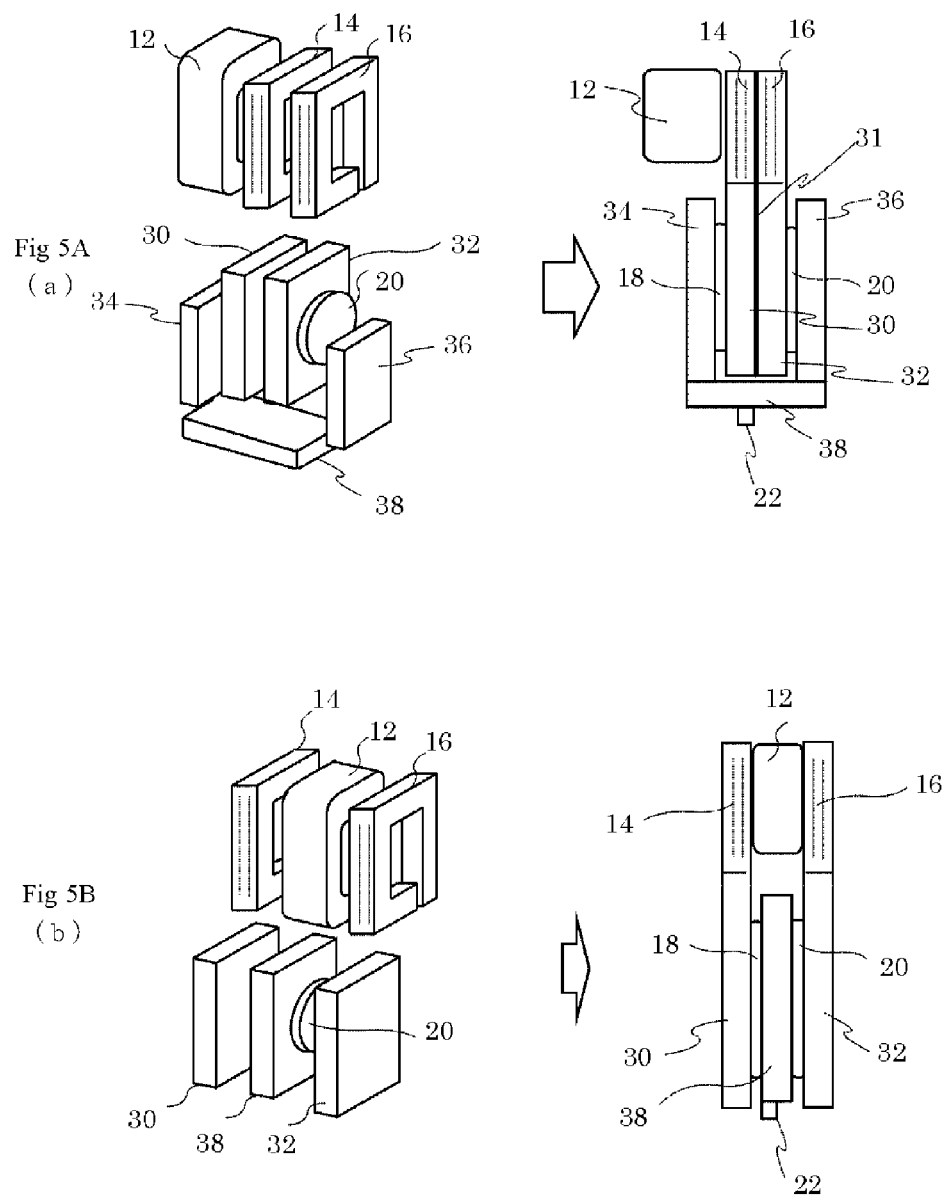
FIG. 5 is a disjoint sideways diagram and a side view diagram of embodiment.

FIG. 5 is a disjoint sideways diagram and a side view diagram of embodiment.

A and B of FIG. 5 show a disjoint sideways diagram on left side, and show a sideview diagram after the assembling on right side. In the example of FIG. 5A, the primary coil 12, the positive side coil 14 and the negative side coil 16 are twisted around a magnetic core (not shown). Because the large electric current is taken out, and it is a hole structure supplying cooling water inside, a positive electric conductor 30 and a negative electric conductor 32 are constructed in thick copperplate. The middle of the positive electric conductor 30 and the negative electric conductor 32 is isolated by a thin insulation layer 31. The rectifying devices 18 and 20 are arranged to sandwich the both sides of the positive electric conductor 30 and the negative electric conductor 32 on a first polar board 34 and a second polar board 36. The first polar board 34 and the second polar board 36 are electricity connected through a third polar board 38, and a plus electrode 22 is fixed on the third polar board 38. In the connection point of the positive side coil 14 and the negative side coil 16, the minus electrode 24 (FIG. 1, FIG. 2, FIG. 3) is furnished by connecting copperplate.

In the example of FIG. 5B, it is to be arranged to sandwich a primary coil (12) between the positive side coil 14 and the negative side coil 16. In the structure, the third polar board 38 is arranged between the positive electric conductor 30 and the negative electric conductor 32, and the rectifying device 18 is sandwiched between the third polar board 38 and the positive electric conductor 30. Further, the rectifying device 20 is sandwiched between the negative electric conductor 32 and the third polar board 38. The plus electrode 22 is fixed on the third polar board 38. In the connection point of the positive side coil 14 and the negative side coil 16, the minus electrode 24 (FIG. 1, FIG. 2, FIG. 3) is furnished by connecting copperplate.

Figure 6:
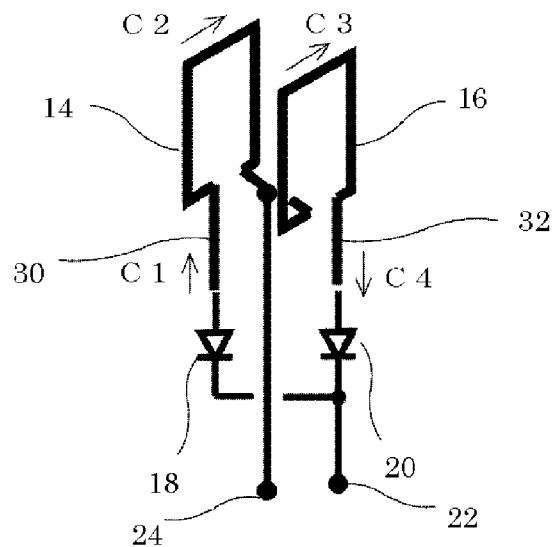
FIG. 6 is an explanation diagram showing an electric current of secondary circuit of a transformer in the commutation time.

FIG. 6 is an explanation diagram showing an electric current of secondary circuit of commutation.

By using the diagram, it is to verify the embodiment stated above. FIG. 6 shows a circuits of the positive side coil 14 and the negative side coil 16 constituting the secondary coil in three-dimensional, so it is also to explain the location relation of the both in a sense. The positive side coil 14 and the negative side coil 16 are rolled back on the connected magnetic core (not shown), the positive electric conductor 30 and the negative electric conductor 32 are connected to the rectifying device 18 and the rectifying device 20 that are drawn out on side direction.

In the commutation time, the electric current of the direction of C1 flows in the positive electric conductor 30, the electric current of the direction of C2 flows in the positive side coil 14, the electric current of the direction of C3 flows in the negative side coil 16, and the electric current of the direction of C4 flows in the negative electric conductor 32. After the condition is that the electric current flows in the opposite direction with C1 just before the positive side coil 14, and the translocation is started, the electric current energy that is accumulated in the positive side coil 14 shows to be discharged in the direction of the negative side coil 16. In the positive side coil 14, because the electric current does not flow into from the rectifying device 18 direction, after the accumulated energy is discharged, the electric current of the C1 direction is extinct. Thus, the translocation is completed.

In the embodiment of FIG. 5A, the positive electric conductor 30 and the negative electric conductor 32 that are almost the same shape, is made to stick firmly through the thin insulation layer 31. After it is such a structure, as shown by FIG. 6, because the directions of the positive electric conductor 30 and the negative electric conductor 32 are opposite, the magnetic flux is mutually denied, the inductances of the both are offset. That is, the inductances of the positive electric conductor 30 and the negative electric conductor 32 obviously become minimum. Therefore, it is possible to further shorten commutation time.

However, after it is to be arranged to make the positive side coil 14 and the negative side coil 16 stick firmly as shown by FIG. 5A, as shown by FIG. 6, with respect to the electric current flowing in the C2 and C3 direction in the positive side coil 14 and the negative side coil 16, it is understood that these coil inductances are largely influenced. That is, it is understood that the inductances of the positive side coil 14 and the negative side coil 16 are put off.

Further, in the case of the structure of the FIG. 5A, in the condition that the load electric current flows in the positive side coil 14, and the load electric current flows in the negative side coil 16, the degree of the magnetism combination with the primary coil 12 is different. On the condition that the load electric current flows in the negative side coil 16, the leak magnetic flux is increased. The unbalance of such magnetism combination is easy to cause abnormal electric current.

Furthermore, after pulses of a high repetition frequency is supplied to the primary coil, because the time M from the start of the electric current of the primary coil to the completion of the electric current of the opposite polarity becomes short, the magnetic core is easy to occur a magnetism saturation according to the sudden magnetic flux change. After the positive side coil 14 and the negative side coil 16 are nearby arranged, the magnetic flux concentrates in the nearby of the secondary coil, and it is easy to occur the magnetic core saturation.

On the other hand, as shown by FIG. 5B, after it is adopted a structure sandwiching the primary coil 12 between the positive side coil 14 and the negative side coil 16, the location relation of the primary coil 12 and the positive side coil 14 becomes the same as the location relation of the primary coil 12 and the negative side coil 16, the unbalance of the magnetism combination does not occur. Further, according to sandwiching the primary coil 12 between the positive side coil 14 and the negative side coil 16, the distance of the intermediate of the positive side coil 14 and the negative side coil 16 is separated, it is possible to make the inductance become small with respect to the electric current flowing in the commutation time. Further, it is difficult to make the magnetic core saturation occur comparing with the structure of FIG. 5A. However, in the example of FIG. 5B, the distance of the intermediate of the positive electric conductor 30 and the negative electric conductor 32 is separated, and the characteristic becomes worse than that of the example of FIG. 5A.

<Embodiment 1>

Figure 7:
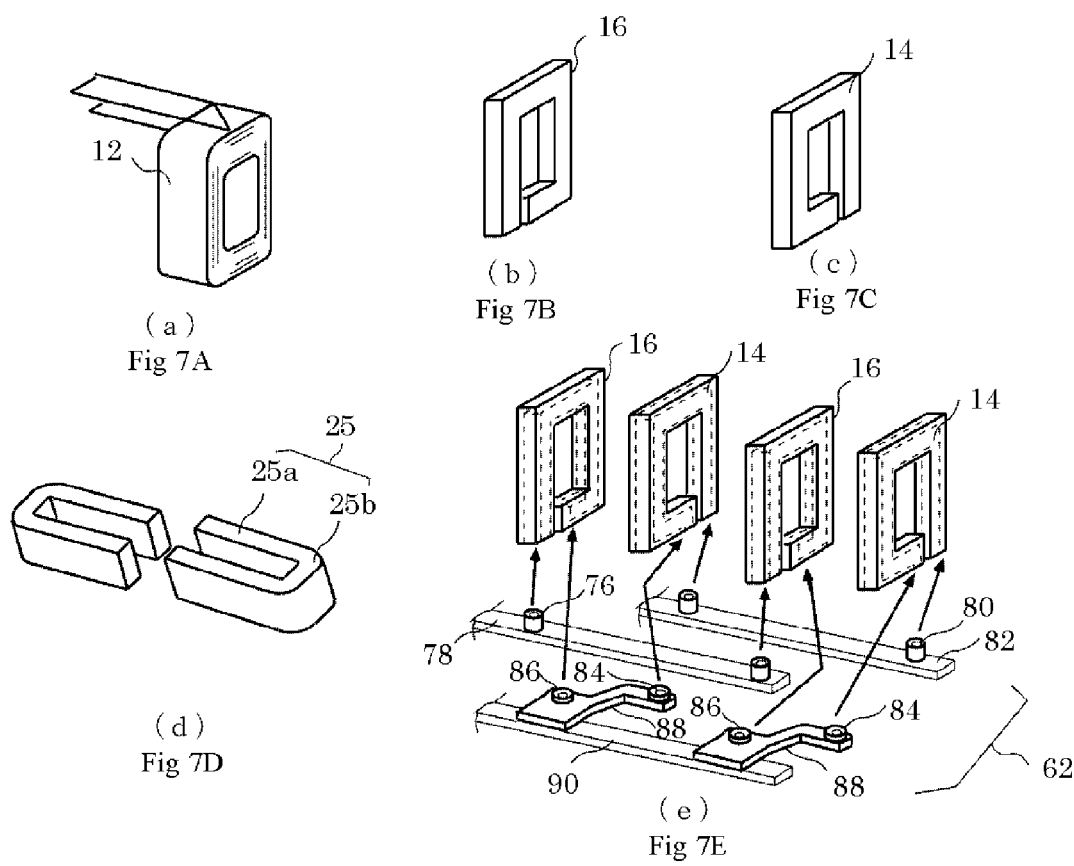
FIG. 7 is a sideways diagram showing an example of a primary coil, a secondary coil, and a magnetic core that are used in the present invention.

FIG. 7 is a sideways diagram showing an example of primary coil, secondary coil, and magnetic core that are used in the present invention.

The present invention, considering the embodiment and so on stated above, improves part structure of the transformer as nest. Firstly, the primary coil 12, for example, as shown by FIG. 7A, is used to roll a flat angle insulation line in multilayer by making the magnetic core as an axis. In the secondary coil, the one turn coil that cuts and processes copperplate in C word shape, is two connected in series to be used. B is the positive side coil 14, and C is the negative side coil 16. These are rolled in the loop magnetic core 25 as shown by D.

The loop magnetic core 25 is a loop that is constructed from a paralleling section 25a and a winding section 25b of U-word shape of the both ends. The magnetism resistance becomes low, and the efficiency of the transformer is raised. Further, as explained later, the primary coil 12, the positive side coil 14 and the negative side coil 16 are arranged without a gap, and the leak magnetic flux becomes the smallest in the paralleling section 25a of the loop magnetic core 25.

FIG. 7E shows an example of an electric conductor group structure of a contact base member 62 electrically connecting a coil group. In the example of the diagram, the positive side coil 14 and the negative side coil 16 have a hole part inside as shown by a broken line. These, for example, are manufactured by forming a hole pipe. An electric conductor 78, an electric conductor 82 and an electric conductor 90 structure a contact base member 62 for electrically connecting the positive side coil 14 and the negative side coil 16. The conductor (78), the conductor (82) and the conductor (90) have a hole part (not shown). A refrigerant route is constructed trough the holes. In the electric conductor 78, the positive side coil 14 and a same number of a projection 76 are arranged. In the electric conductor 82, the negative side coil 16 and a same number of the projection 80 are arranged. In the electric conductor 90, the number of the connection point of the positive side coil 14 and the negative side coil 16, a same number of a branch 88, a projection 84, and a projection 86 are arranged. The branch 88 has a hole part (not shown). The hole part of the branch 88 connected to the hole part of the electric conductor 90.

Respective projections are electric conductors of a pipe shape, and are fixed on the surface of a wall of respective electric conductors. The projection 76 is connected on one end of the entire positive side coils 14. That is, the projection 76 and the electric conductor 78 possess a function of supplying refrigerant such as cooling water and the like to respective coils through the hole part, and possess a function of electrically connecting one end of the positive side coil 14 in parallel.

The projection 80 is connected to one end of the entire negative side coils 16. That is, the projection 80 and the electric conductor 82 possess a function of supplying refrigerant such as cooling water and the like to respective coils through the hole part, and possess a function of electrically connecting one end of the negative side coil 16 in parallel.

The projection 86 is connected to the other end (the stated connection point side) of the entire positive side coils 14. The projection 84 is connected to the other end (the stated connection point side) of the entire negative side coils 16. The branch 88 electrically connects other end of the positive side coil 14 and other end of the negative side coil 16. All the branches 88 are integrated with an electric conductor 90. Then, the projection 84, the projection 86, the branch 88 and the electric conductor 90, for example, have a function of outputting refrigerant such as cooling water and the like from respective coils through the hole part. At the same time, the projection 84, the projection 86, the branch 88 and the electric conductor 90 possess a function of electrically connecting the connection point of the positive side coil 14 and the negative side coil 16 in parallel. Instead of the hole part, a pipe for flowing refrigerant can be connected to the projection 84, the projection 86, the branch 88 and the electric conductor 90.

Figure 8:
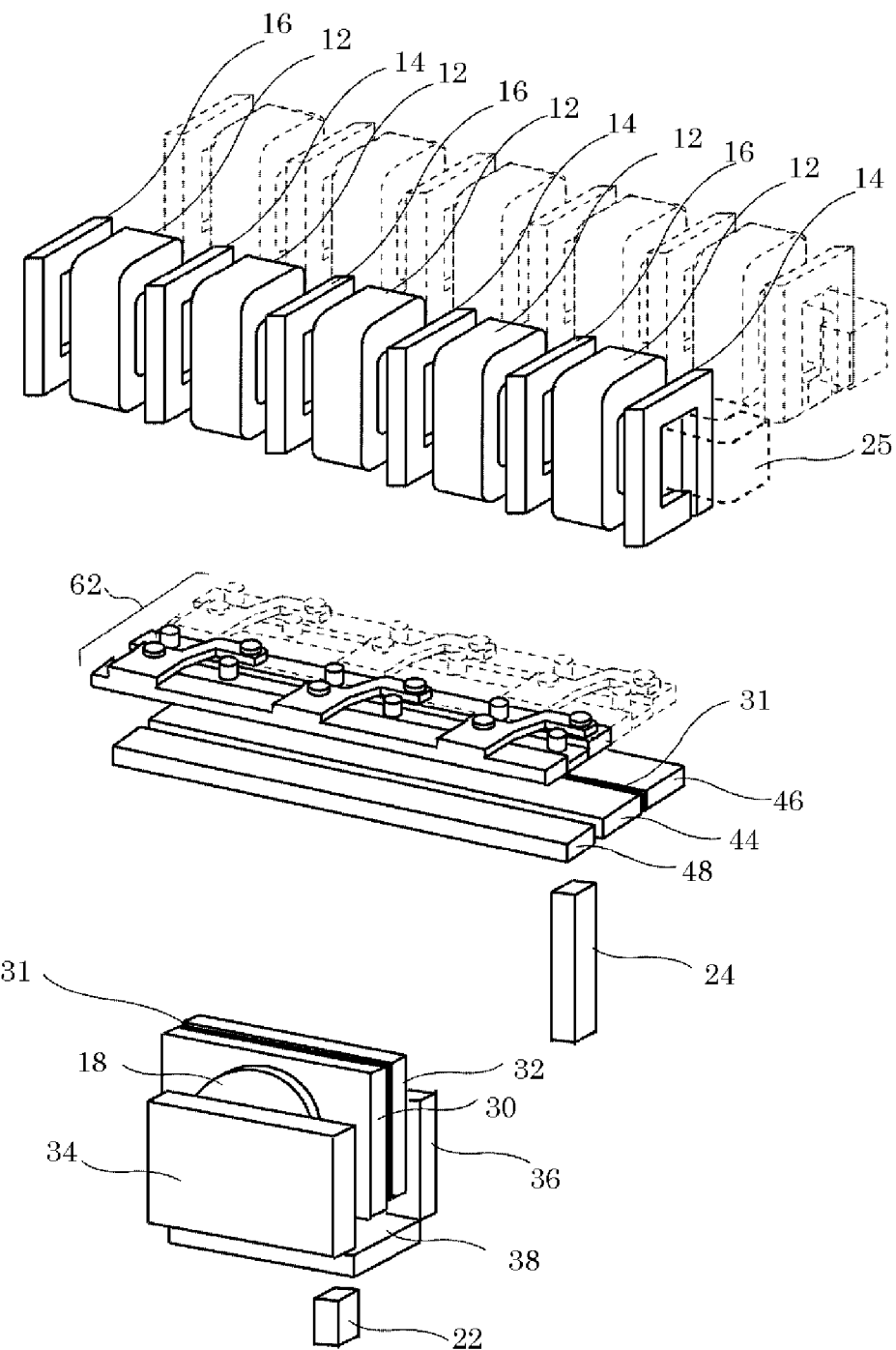
FIG. 8 is a disjoint sideways diagram and a sideview diagram showing a main part embodiment of welding transformer of the present invention.

The electric conductor 78, the electric conductor 82 and the electric conductor 90 that structure the contact base member 62, are integrated on the condition that insulation paint is covered. The condition is shown by FIG. 8. On the other hand, by furthermore enlarging the touch area of the electric conductor 78, the electric conductor 82, the electric conductor 90 and respective coils, the cooled efficiency is raised, so it is possible to let the shape of the contact base member come near a rectangular parallelepiped.

FIG. 8 is a disjoint sideways diagram of the welding transformer main part of embodiment 1.

In the example of the diagram, three pairs of a positive side coil 14 and a negative side coil 16 are used. The primary coil (12) is divided into plural parts. Each part is inserted between the coils. The pairs are respectively three groups on the left and right, and six groups in total, a coil group of two rows structure is formed. The positive side coil 14 and the negative side coil 16 are mutually arranged, and the primary coil 12 that is divided and rolled in respective intervals is arranged. Because the diagram becomes troublesome, the second row of the coil group is shown by the broken line. Further, a magnetic core 5 is also shown by the broken line.

The divided and rolled primary coil 12 may all be connected in series, the whole or one part may also be connected in parallel. The plural positive side coils 14 may all be connected in parallel, the whole or one part may also be connected in series. The plural negative side coil 16 may all be connected in parallel, the whole or one part may also be connected in series.

Further, the number of the positive side coil 14 and the negative side coil 16 may be increased freely. The plural positive side coils 14 and the plural negative side coils 16 are connected in series. One end of the positive side coil 14 is electrically connected to the positive electric conductor 30 through the first connection polar board 44. One end of the negative side coil 16 is electrically connected to the negative electric conductor 32 through the second connection polar board 46. The other end of the positive side coil 14 and the other end of the negative side coil 16 are connected to the third connection polar board 48. The third connection polar board 48 is connected to the minus electrode 24.

Moreover, the first connection polar board 44, every one of the second connection polar board 46 and the third connection polar board 48, extends along a direction parallel with the paralleling section 25*a* of the loop magnetic core 25. In other words, a long electric conductor is used in the arrangement direction of the positive side coil 14, the primary coil 12 and the negative side coil 16. Thus, the coil group, the contact base member 62 and the connected electric conductor group are accommodated in a frame of a long oblong in the same direction. Then, the coil group is supported and fixed on one surface of the contact base member 62. Furthermore, the positive electric conductor 30 and the negative electric conductor 32, on the surface side of the other side of the contact base member 62, become a shape that has a boundary surface extending along a direction that is perpendicularly separate from the surface of the corresponding other side, so one surface side and the other surface side of the contact base member 62 are also accommodated in the rectangular parallelepiped of the same thickness. Therefore, as explained by using FIG. 18 and so on later, it is possible to become a flat and compact shape.

In order to sandwich the positive electric conductor 30 and the negative electric conductor 32, by arranging the rectifying device 18 and 20 on the both sides, furthermore, the outside is sandwiched by the first polar board 34 and the second polar board 36. The first polar board 34 and the second polar board 36 are electrically connected through the third polar board 38. The plus electrode 22 is fixed on the third polar board 38. The first connection polar board 44 and the second connection polar board 46 are firmly sticked through the thin insulation layer 31. Further, the positive electric conductor 30 and the negative electric conductor 32 are also firmly sticked through the thin insulation layer 31. The thin insulation layer 31 is, for example, an insulation paint soak layer.

Moreover, for the electrically connecting of interval of the first connection polar board 44, the second connection polar board 46 and the third connection polar board 48 with the plural positive side coils 14 and the negative side coils 16, the contact base member 62 is arranged on these intervals. The plural projections that are established on the above surface of the contact base member 62, are fixed on the terminal of the positive side coil 14 and the negative side coil 16, and then electrically connected. Further, these projections become tubular shape, through these projections, the cooling water may be flow into the hole part of the positive side coil 14 and the negative side coil 16.

The electric conductor structure of the contact base member 62, if the circuit can be equal, can be designed voluntarily. Especially, the contact base member 62 is directly connected to the plural positive side coils 14 and the negative side coils 16, so if it is cooled by the hole structure, it is possible to strongly cool the positive side coil 14, the negative side coil 16 and the primary coil. It is also possible to structure the positive side coil 14 and the negative side coil 16 through the copperplate of a hole structure.

According to the structure stated above, the first connection polar board 44 and the second connection polar board 46 are nearby arranged, and the positive electric conductor 30 and the negative electric conductor 32 are nearby arranged, so it is possible to make the inductance of the positive electric conductor 30 and the negative electric conductor 32 become minimum in the commutation time. Further, the distance of the interval of the positive side coil 14 and the negative side coil 16 is separated, so it is possible to make the inductance of the positive side coil 14 and the negative side coil 16 decrease in the commutation time. By these, it is possible to shorten the commutation time, the aim of the present invention is that a control becomes possible in which the repetition frequency uses a pulse of 5 kHz~50 kHz degree.

Further, the primary coil 12 is arranged between the positive side coil 14 and the negative side coil 16, so the balance of the magnetism combination of the intermediate of the primary coil 12, the positive side coil 14 and the negative side coil 16 is well, and a stable and well welding electric current is obtained. Moreover, according that the positive side coil 14 and the negative side coil 16 in which large electric current is flow, are separated, it is also possible that it is difficult to cause the magnetism saturation of the loop magnetic core 25.

Figure 9:
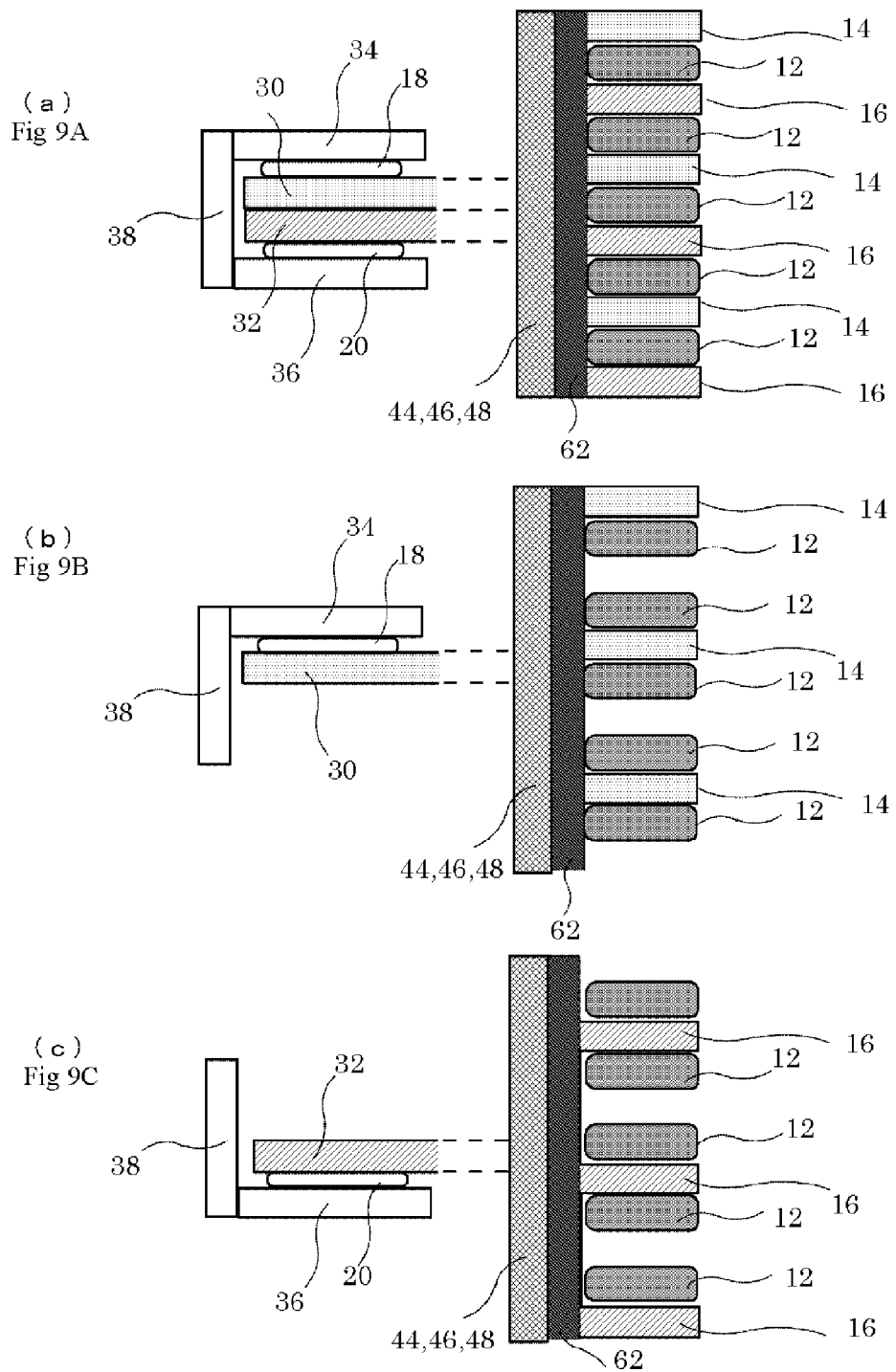
FIG. 9 is an explanation diagram showing a location relation of primary coil, positive side coil and negative side coil showed in FIG. 8.

FIG. 9 is an explanation diagram showing a location relation of primary coil, positive side coil and negative side coil.

The apparatus, the adherence of the primary coil 12, the positive side coil 14 and the negative side coil 16 is well, is constructed whose balance is the most suitable. As shown by FIG. 9A, respective coils are arranged from the upper in an order, that is served as the positive side coil 14, the primary coil 12, the negative side coil 16, the primary coil 12, the positive side coil 14, the primary coil 12 and so on.

The plural positive side coils 14 are all connected in parallel, and one terminal is connected to the positive electric conductor 30. Further, the negative side coils 16 are also all connected in parallel, and one terminal is connected to the negative electric conductor 32. The contact base member 62 is electrically connected to these. FIG. 9B is a diagram that shows an only part in which the electric current is efficiently flow when the electric current of the positive side coil 14 is supplied to the welding device side. FIG. 9C is a diagram that shows an only part in which the electric current is efficiently flow when the electric current of the negative side coil 16 is supplied to the welding device side.

As understood by observing FIG. 9B, any primary coil 12 is also firmly sticked on the every positive side coil 14. Further, as understood by observing FIG. 9C, any primary coil 12 is also firmly sticked on the negative side coil 16. This is because that the positive side coil 14 and the negative side coil 16 are arranged to sandwich the divided primary coil 12 on all the place of the magnetic core.

Thus, the magnetic coupling between the primary coil 12 and the positive side coil 14, and the magnetism combination between the primary coil 12 and the negative side coil 16, are well, so the positive side coil 14 and the negative side coil 16 can completely achieve balance.

Figure 10:
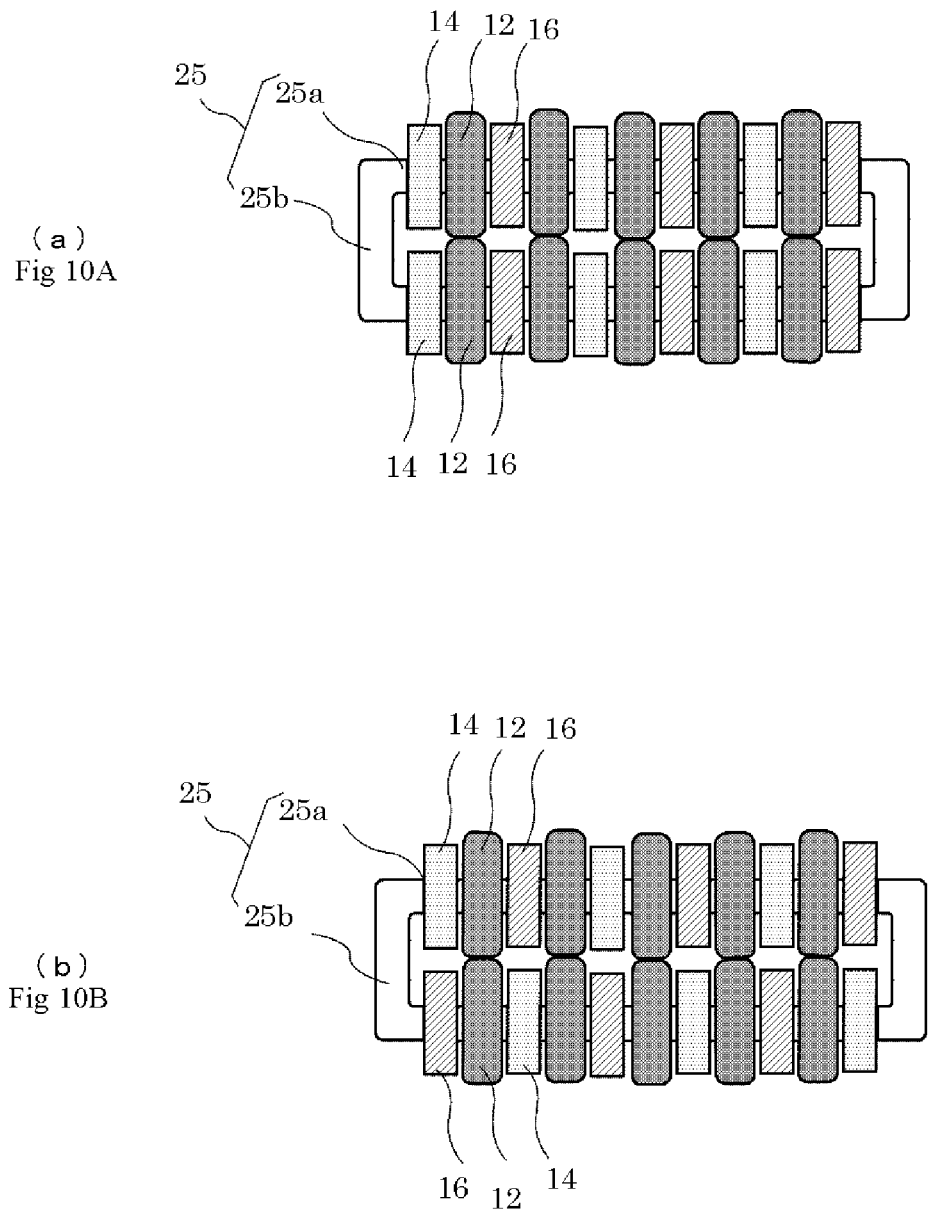
FIG. 10 is an explanation diagram showing a relation of primary coil, positive side coil, negative side coil and magnetic core.

FIG. 10 is an explanation diagram showing a relation of primary coil, positive side coil, negative side coil and magnetic core.

As the diagram shown, the magnetic core 25 comprises a winding section 25b of a U-word shape on the both ends, and the winding section 25b is exposed. However, in the paralleling section 25a, the coil group is rolled back without a gap. Thus, the decrease of the leak magnetic flux and the miniaturization are strove. Here, with respect to FIG. 10A, the structure and the arrangement of the two row of the coil group are completely the same. That is, the coil is arranged in an order from the left, in an order of the positive side coil 14, the primary coil 12 and the negative side coil 16.

On the other hand, with respect to FIG. 10B, in the row of one side, the coil is arranged in an order from the left, in an order of the positive side coil 14, the primary coil 12 and the negative side coil 16; and in the row of the other side, the coil is arranged in an order from the left, in an order of the negative side coil 16, the primary coil 12 and the positive side coil 14. There are merits and demerits in production, magnetism characteristic, and structure of the contact base member 62 and so on respectively. Corresponding to the whole of the size and coil number and so on, it is well if a most suitable structure is selected.

Further, when the arrangement of the positive side coil 14 and the negative side coil 16 is checked by following the loop of the magnetic core 25, FIG. 10A, on the both ends of the magnetic core 25, has a part in which two positive side coils 14 are adjoined, and has a part in which two negative side coils 16 are adjoined. Everyone does not sandwich the primary coil 12 in the middle. Like this, with respect to FIG. 10B, on the both ends of the magnetic core 25, there is a part in which the positive side coils 14 and the negative side coil 16 are adjoined. Here, the primary coil 12 is also not sandwiched. Like this, by comparing one part with other part, it doesn't matter even if a part is included in which the characteristic is bad. It is possible to attain an objective according that a place is mostly established where the positive side coil 14, the primary coil 12 and the negative side coil 16 are arranged in this order, which is served as the whole.

Figure 11:
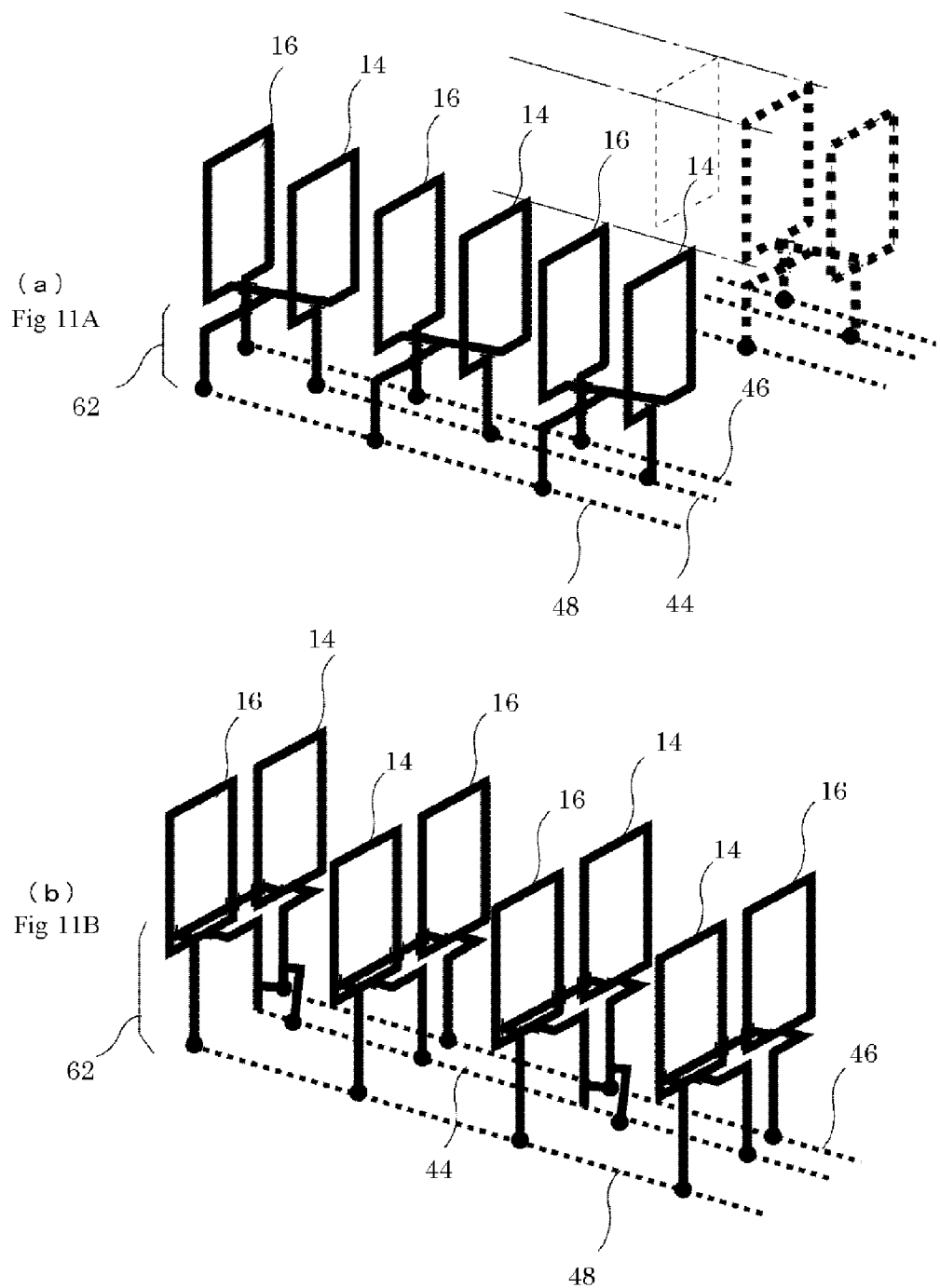
FIG. 11 is a sideways diagram showing a circuit example of secondary coil.

FIG. 11 is a sideways diagram showing a circuit example of secondary coil.

FIG. 11A of the diagram shows the circuit of the embodiment of FIG. 10A, and FIG. 11B shows the circuit of the embodiment of FIG. 10 B.

In the case of the FIG. 11A, from the front of the diagram, three groups of the positive side coil 14 and the negative side coil 16 are respectively connected in series in per one group. Then, one terminal of the positive side coil 14 is connected to the first connection polar board 44, and one terminal of the negative side coil 16 is connected to the second connection polar board 46. FIG. 11A is the circuit made by the structure that is explained by FIG. 7E.

In the case of FIG. 11B, the positive side coil 14 and the negative side coil 16 are arranged on the left and the right in which the axis becomes parallel. That is, the positive side coil 14 and the negative side coil 16 are established in four-groups and two vertical rows. In the row of the vertical direction, the positive side coil 14 and the negative side coil 16 are arranged mutually. If one terminal of the positive side coil 14 and the negative side coil 16 is changed in per one group with respect to the first connection polar board 44 and the second connection polar board 46, the circuit is realized. The connection point of the positive side coil 14 and the negative side coil 16 is connected to the third connection polar board 48.

Moreover, it doesn't matter if the positive side coil 14 and the negative side coil 16 are not the same number. Further, it doesn't matter if the largeness and the shape of the individual coil are not the same. The positive side coil 14 (or the coil group) and the negative side coil 16 (or the coil group) are connected in series mutually. The circuit of the intermediate of respective coils and polar boards becomes comparatively complex as the diagram. For example, it is constructed by arranging the electric conductor group in three-dimension as shown by FIG. 8. It becomes possible to efficiency cool the whole transformer by cooling the contact base member 62 that is a hole structure.

Figure 12:
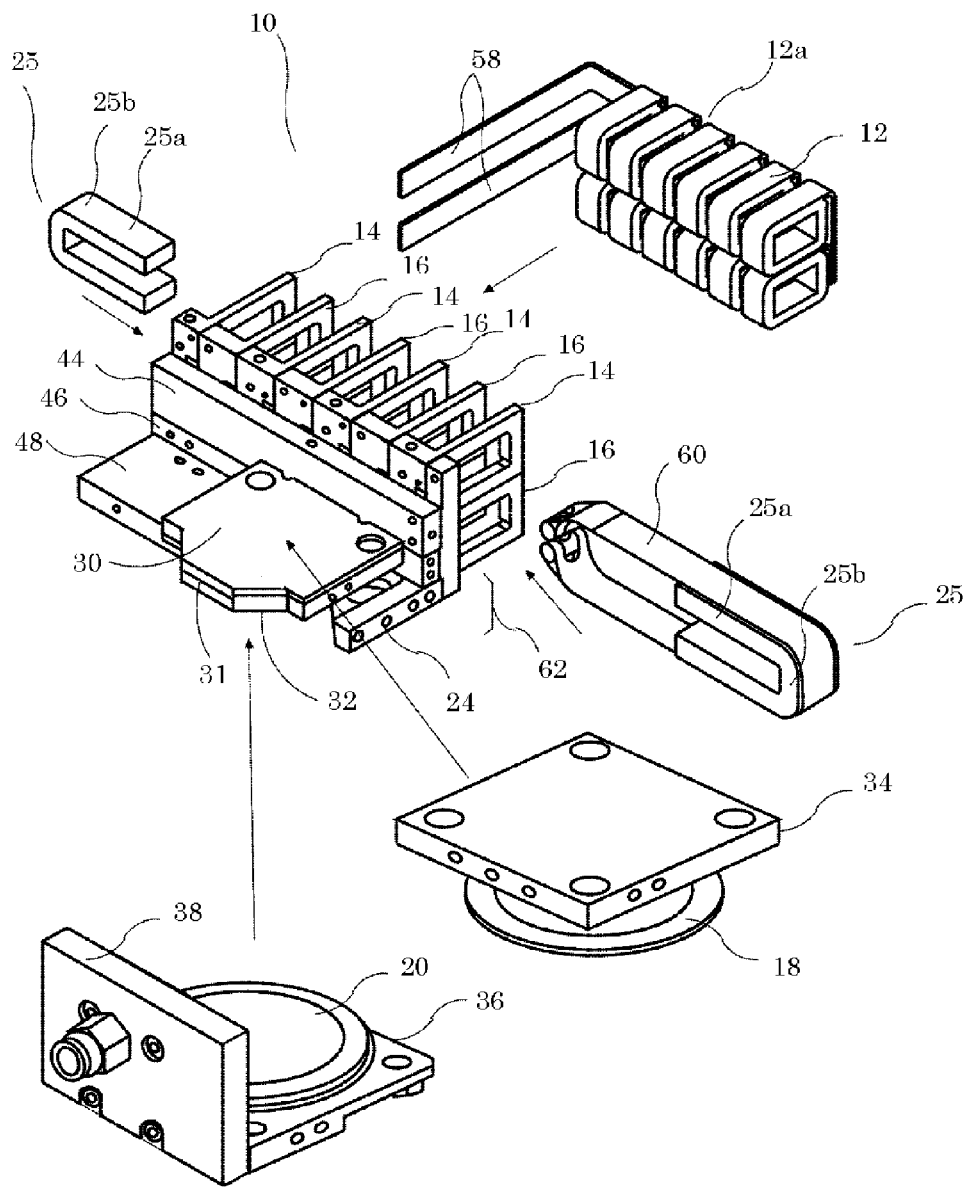
FIG. 12 is a disjoint sideways diagram showing an embodiment of welding transformer of the present invention.

The current path length is short that connects between the intermediate of respective coils and the first connection polar board 44, and the second connection polar board 46. However, the current path length are long, comparing with the coil size, in the positive electric conductor 30 and the negative electric conductor 32 that are connected to the first connection polar board 44 and the second connection polar board 46. Therefore, the inductance of the current path brings a problem. Then, as stated above, the positive electric conductor 30 and the negative electric conductor 32 are arranged nearby for reducing the inductance. Moreover, the first connection polar board 44 and the second connection polar board 46 are arranged nearby necessarily like this. On the other hand, the third connected polar board 48 is not established between the first connection polar board 44 and the second connection polar board 46. It is also effective for reducing inductance FIG. 12 is a disjoint sideways diagram showing a real welding transformer in embodiment 1.

Seven groups of the positive side coils 14 and the negative side coils 16 are established. Between these positive side coils 14 and negative side coils 16, the primary coil 12 is established. An input terminal 58 of the primary coil 12 is drawn out in a side direction. The divided and rolled primary coil 12 is all connected in series. The input terminal 58 supplies primary electric current to the primary coil 12.

After the positive side coil 14 and the negative side coil 16 are sandwiched into every gap 12a that is established in the primary coil 12 in per one, the magnetic core 25 is installed. The magnetic core 25 is divided into two parts, but it is completed and unified on a completion band 60. the primary coil 12, the positive side coil 14 and the negative side coil 16 are established so that the whole paralleling section 25a of the magnetic core 25 is covered, so there is little leak magnetic flux, and a good characteristic is obtained.

Figure 14:
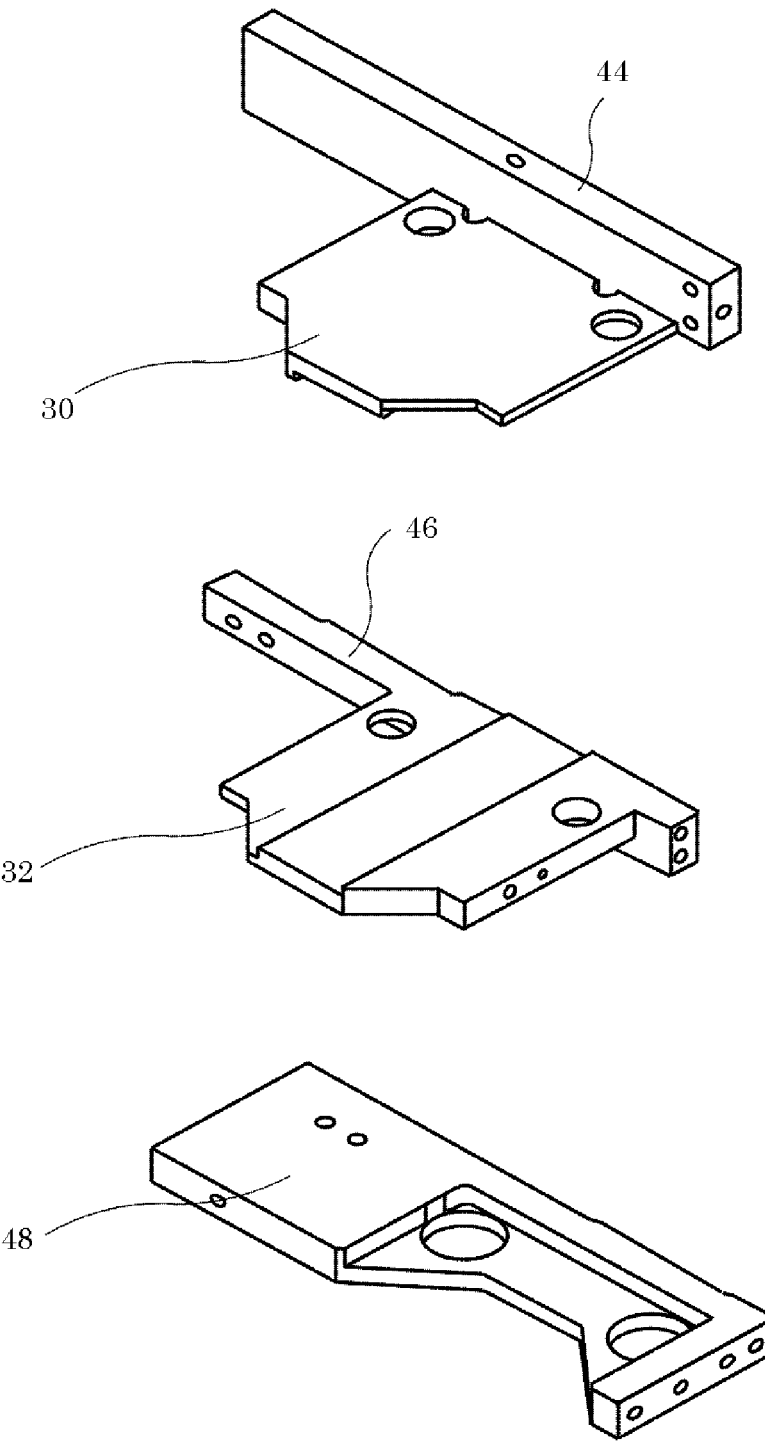
Figure 15:
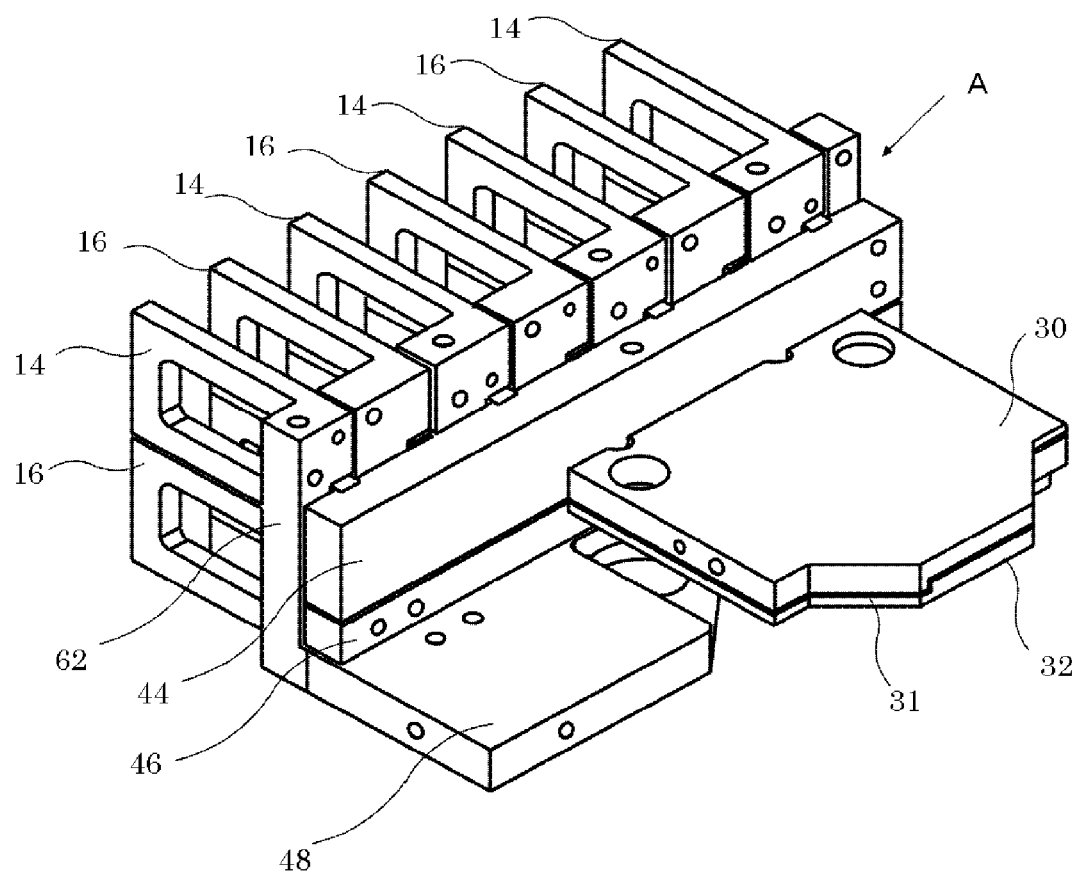
FIG. 15 is a sideways diagram showing a condition after respective polar boards are fixed on the contact base member 62.
Figure 16:
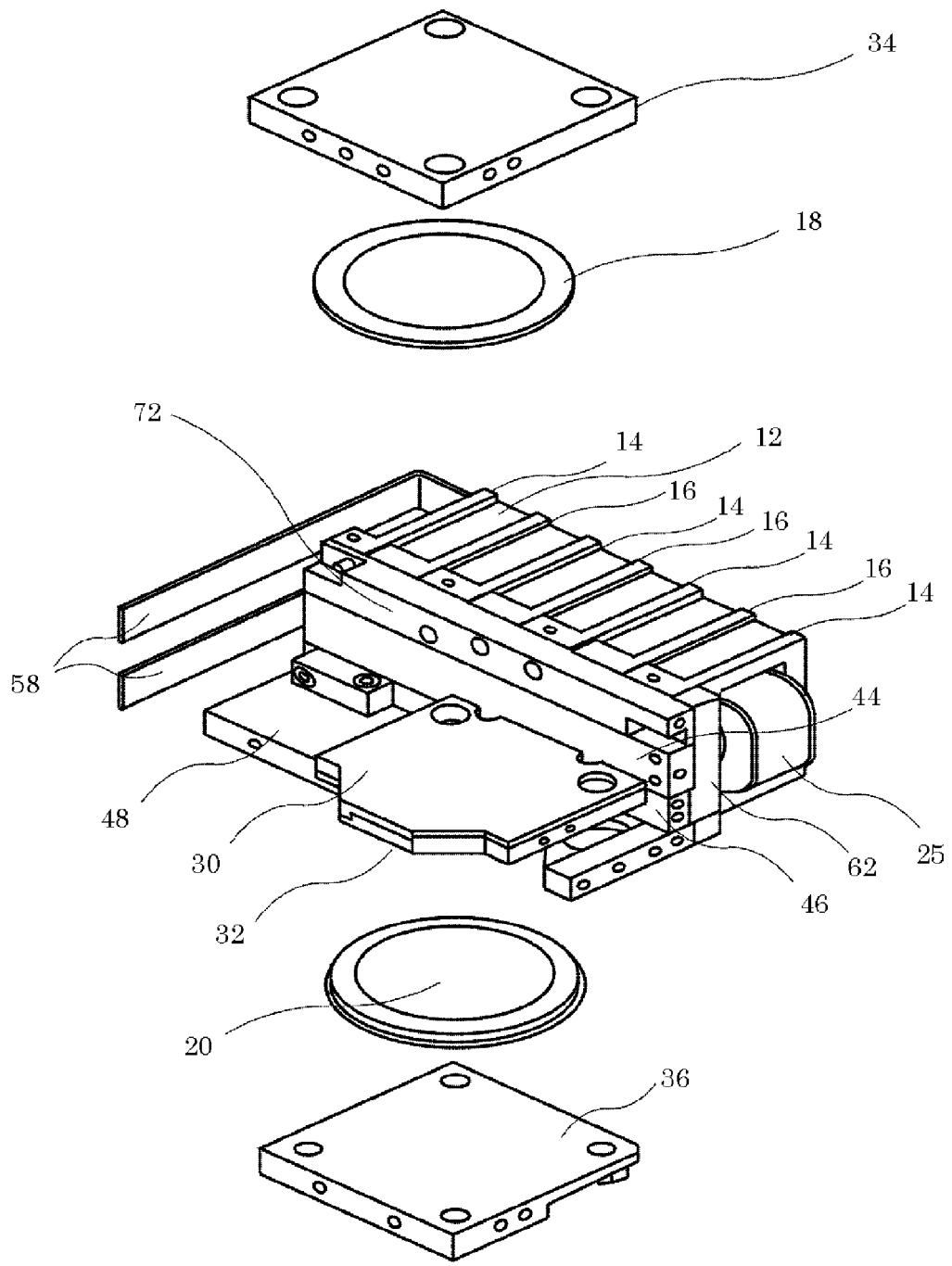
FIG. 16 is a disjoint sideways diagram showing a condition just before the rectifying device 18 and the rectifying device 20 are furnished.

FIG. 13 is a sideways diagram of positive side coil 14, negative side coil 16 and contact base member 62; FIG. 14 is a disjoint sideways diagram of a first connection polar board 44, a second connection polar board 46, a third connection polar board 48 and so on; FIG. 15 is a sideways diagram showing a condition after respective polar boards are fixed on the contact base member 62; and FIG. 16 is a disjoint sideways diagram showing a condition just before the rectifying device 18 and the rectifying device 20 are furnished.

Referring to the above respective diagrams, it is to explain a process assembling the real welding transformer. As shown by FIG. 13, the positive side coil 14 and the negative side coil 16 are made to unify a part with the contact base member 62, and are supported and fixed on the surface of one side of the contact base member 62. With respect to FIG. 13A, in the front row, from the left in an order, the positive side coil 14, the negative side coil 16, the positive side coil 14, the negative side coil 16, the positive side coil 14, the negative side coil 16 and the positive side coil 14 are arranged. In the negative side row, from the left in an order, the negative side coil 16, the positive side coil 14, the negative side coil 16, the positive side coil 14, the negative side coil 16, the positive side coil 14 and the negative side coil 16 are arranged.

On the surface of the other side of the contact base member 62, a terminal 67, a terminal 68 and a terminal 69 are respectively arranged in a row. There are four terminal 67s. One end of the entire positive side coils 14 is connected to any terminal 67 inside of the contact base member 62. There are four terminal 68s. One end of the entire negative side coils 16 is connected to any terminal 68 inside of the contact base member 62. There are four terminal 69s. All the connection points of the positive side coil 14 and the negative side coil 16 are connected to any terminal 69 inside of the contact base member 62. The four terminal 67s are connected to the first connection polar board 44. The four terminal 68s are connected to the second connection polar board 46. The four terminal 69s are connected to the third connection polar board 48.

With respect to the example shown by FIG. 14, the first connection polar board 44 is continuously unified with the positive electric conductor 30. Further, the second connection polar board 46 is continuously unified with the negative electric conductor 32. Anyone of the first connection polar board 44, the second connection polar board 46 and the third connection polar board 48 is a shape that extends along a direction parallel with the paralleling section 25a of the loop magnetic core 25. Moreover, the majority of holes that are drawn in the structure parts of respective diagrams after FIG. 13 are for making way for the refrigerant such as the cooling water and the like, so by connecting a pipe (not shown), the cooling water and the like are supplied from the outside. Further, the cooling water and the like are output from other holes.

As shown by FIG. 15, after the first connection polar board 44, the second connection polar board 46 and the third connection polar board 48 are supported and fixed on the surface of the other side of the contact base member 62, the positive electric conductor 30 and the negative electric conductor 32 become a structure extending along a direction that is perpendicularly separate from the corresponding other surface. Moreover, the other surface of the contact base member 62 is one-part exposed. Here, the majority of holes are empty. These holes are for supplying the refrigerant such as the cooling water and the like to the hole part of the positive side coil 14 and the negative side coil 16 through the hole part of the contact base member 62, so a refrigerant supplying route 72 is furnished, and then a refrigerant route is constructed. Then, as shown by FIG. 16, the rectifying device 18 and the rectifying device 20, are made to firmly stick respectively, and are sandwiched between the first polar board 34 and the second polar board 36.

After the refrigerant is supplied to the hole part of the contact base member 62, it is possible to cool the positive side coil 14 and the negative side coil 16. Because it is arranged that respective parts of the primary coil 12 that is divided and rolled, are sandwiched between the plural positive side coils 14 and the plural negative side coils 16, it is possible to efficiently cool the whole transformer including the primary coil 12 through the positive side coil 14 and the negative side coil 16.

Figure 17:
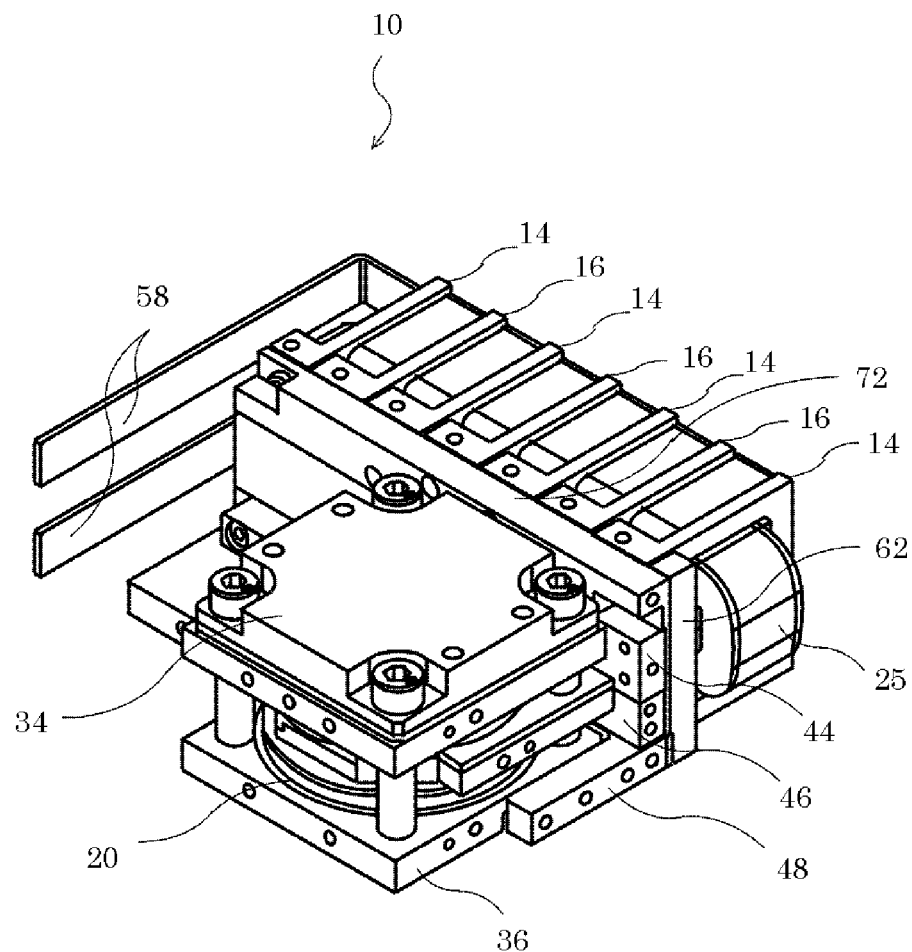
FIG. 17 is a sideways diagram of the welding transformer in which assembling is almost completed.
Figure 18:
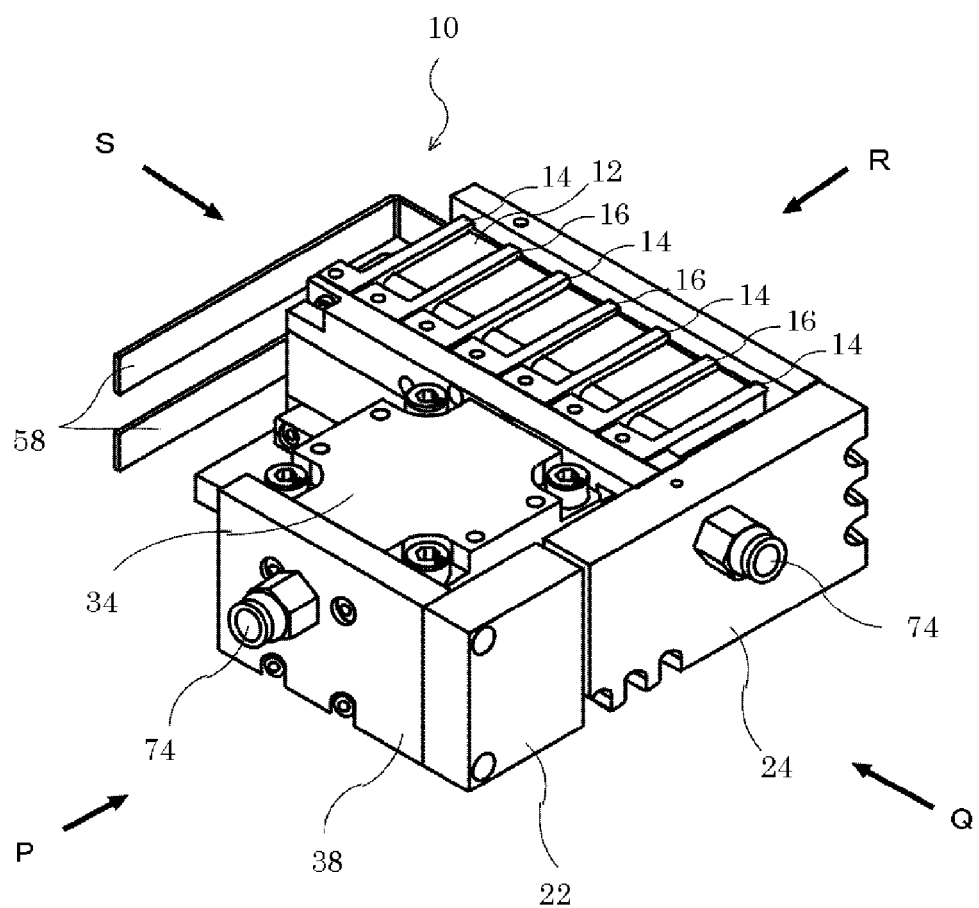
FIG. 18 is a sideways diagram of the welding transformer of a condition that plus electrode and minus electrode are furnished.

FIG. 17 is a sideways diagram of the welding transformer in which assembling is almost completed; and FIG. 18 is a sideways diagram of the welding transformer of a condition that plus electrode and minus electrode are furnished.

As shown by the diagram, on the short brim side of any one side of the contact base member 62 of the welding transformer 10, a plus electrode 22 and a minus electrode 24 are fixed. Because of the structure, the width of the short brim direction of the contact base member 62 is made to be fully narrow, as explained later, it is possible to connect by making the welding transformers of the same structure overlap.

Further, a refrigerant supplying bolt 74 is furnished on the third polar board 38 and the minus electrode 24. That is, the third polar board 38 and the minus electrode 24 both have a hole part, the refrigerant such as cooling water and the like are supplied inside. Further, these hole parts, through a plumbing, are connected to the hole part of the contact base member 62, the positive side coil 14 and the negative side coil 16, so it is possible to cool the whole welding transformer. The refrigerant supplying bolt 74 may also be furnished on the plus electrode 22.

With respect to FIG. 18, it is determined that the surface on which the third polar board 38 of the welding transformer 10 is fixed, is called as the surface of P side; the surface on which the minus electrode 24 is fixed, is called as the surface of Q side; the surface of the opposite side with the third polar board 38 with respect to the welding transformer 10, is called as the surface of R side; and the surface of the opposite side with the minus electrode 24, is called as the surface of S side. On this case, the third polar board 38 may also be established on anyone of the surface of P side, the surface of Q side and the surface of S side. Further, the minus electrode 24 may also be established on anyone of the surface of P side, the surface of Q side and the surface of R side. The refrigerant supplying bolt 74 may also be established on any surface of P side, Q side, S side and R side.

<Embodiment 2>

Figure 19:
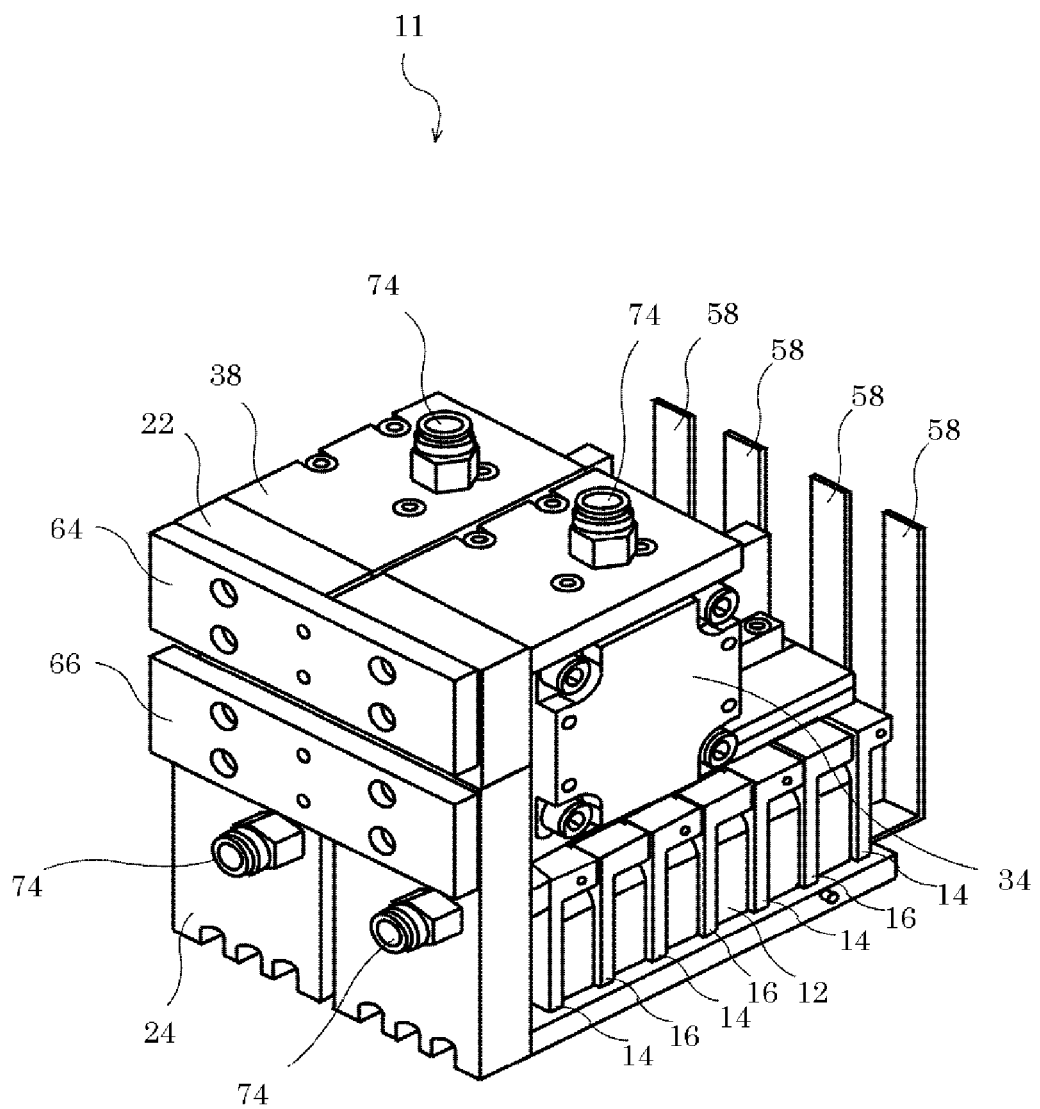
FIG. 19 is a sideways diagram of a welding transformer assembly that is combined by two welding transformers shown by FIG. 18.

FIG. 19 is a sideways diagram of a welding transformer assembly 11 that is combined by two welding transformers shown by FIG. 18.

The primary coil 12 of the diagram connects part of the plus electrode 22 through the commonness plus electrode 64, and connects part of the minus electrode 24 through the commonness minus electrode 66. Thus, by connecting two welding transformers in parallel, it is possible to supply large electric current. Moreover, respective electric conductors and polar boards that are explained in FIG. 12, FIG. 17 and FIG. 18, are respectively isolated, but it doesn't matter even if they are unified. For example, the third connection polar board 48 and the minus electrode 24 may also be unified. Further, the first polar board 34, the second polar board 36, the third polar board 38 and the plus electrode 22 may also be unified in arbitrary combination. As explained by FIG. 14, the second connection polar board 46 and the negative electric conductor 32, the first connection polar board 44 and the positive electric conductor 30 may be unified respectively.

As the diagram shown, it is arranged that the paralleling section 25a of the loop magnetic core 25 of respective welding transformers becomes parallel mutually, and the third polar board 38 is nearby connected in a shortest distance. At this time, respective third polar board 38s of respective welding transformers are arranged on the same surface. On this condition, through the commonness plus electrode 64 and the commonness minus electrode 66, it is possible to use by combining over two welding transformers, and by electrically and mechanically connecting them.

On the one side of the contact base member 62, the primary coil 12, the positive side coil 14 and the negative side coil 16 are arranged, on the other side of the contact base member 62, the polar board and the rectifying device are arranged for the electrical connection, so it is possible to accommodate the whole in the thickness of the coil part. Moreover, the commonness plus electrode 64 and the commonness minus electrode 66 may also be established on any surface of P side, Q side, S side and R side that are explained by FIG. 18. Here, when two surfaces except the surface of P side, Q side, S side and R side, are defined as side surfaces of the welding transformer, the plural welding transformers become to be connected by making anyone of the side surfaces correspond.

<Embodiment 3>

Figure 20:
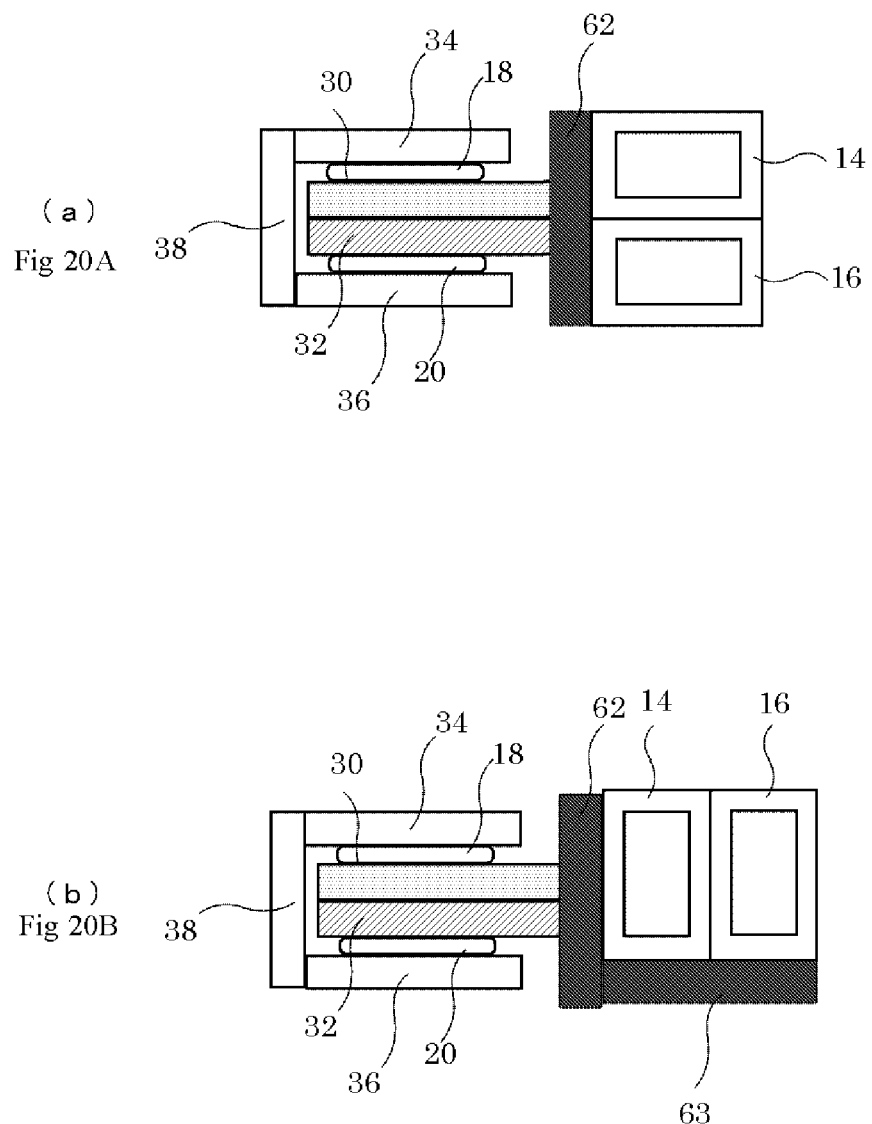
FIG. 20 is a sideview diagram showing a relation of the positive side coil 14, the negative side coil 16 and the contact base member.

FIG. 20 is a side view diagram showing a relation of the positive side coil 14, the negative side coil 16 and the contact base member.

In the embodiment stated above, on the surface of one side of the contact base member 62, the positive side coil 14 and the negative side coil 16 are arranged in a horizontal row. This is a condition of A of the diagram. On the surface side of the other side of the contact base member 62, the same as the embodiment stated above, the positive electric conductor 30 and the negative electric conductor 32, the rectifying device 18 and the rectifying device 20, the first polar board 34 and the second polar board 36 are overlapped in an order. The first polar board 34 and the second polar board 36 are connected on the third polar board 38.

On the other hand, in the FIG. 20B of the diagram (embodiment 3), the positive side coil 14 and the negative side coil 16 are arranged to pile up on the surface of one side of the contact base member 62. Then, for the circuits of the positive side coil 14 and the negative side coil 16, an assistance contact base member 63 is furnished. Through the assistance contact base member 63 and the contact base member 62, the positive side coil 14 and the negative side coil 16 are line tied, and the surface side of the other side of the contact base member 62 is connected to the positive electric conductor 30 and the negative electric conductor 32.

That is, in order to support two side surfaces of the coil group of a condition on which the primary coil 12 sandwiches the positive side coil 14 and the negative side coil 16 per one, a contact base member is formed in a section L-word. Even if it is such structure, it is possible to complete the welding transformer as the whole in flat and small size. Further, as explained by FIG. 19, it is possible to use plural welding transformers by overlapping them and connecting them in parallel. Further, the intensity is improved through the contact base member that is formed in a section L-word, and the cooled efficiency also becomes well.

<Embodiment 4>

Figure 21:
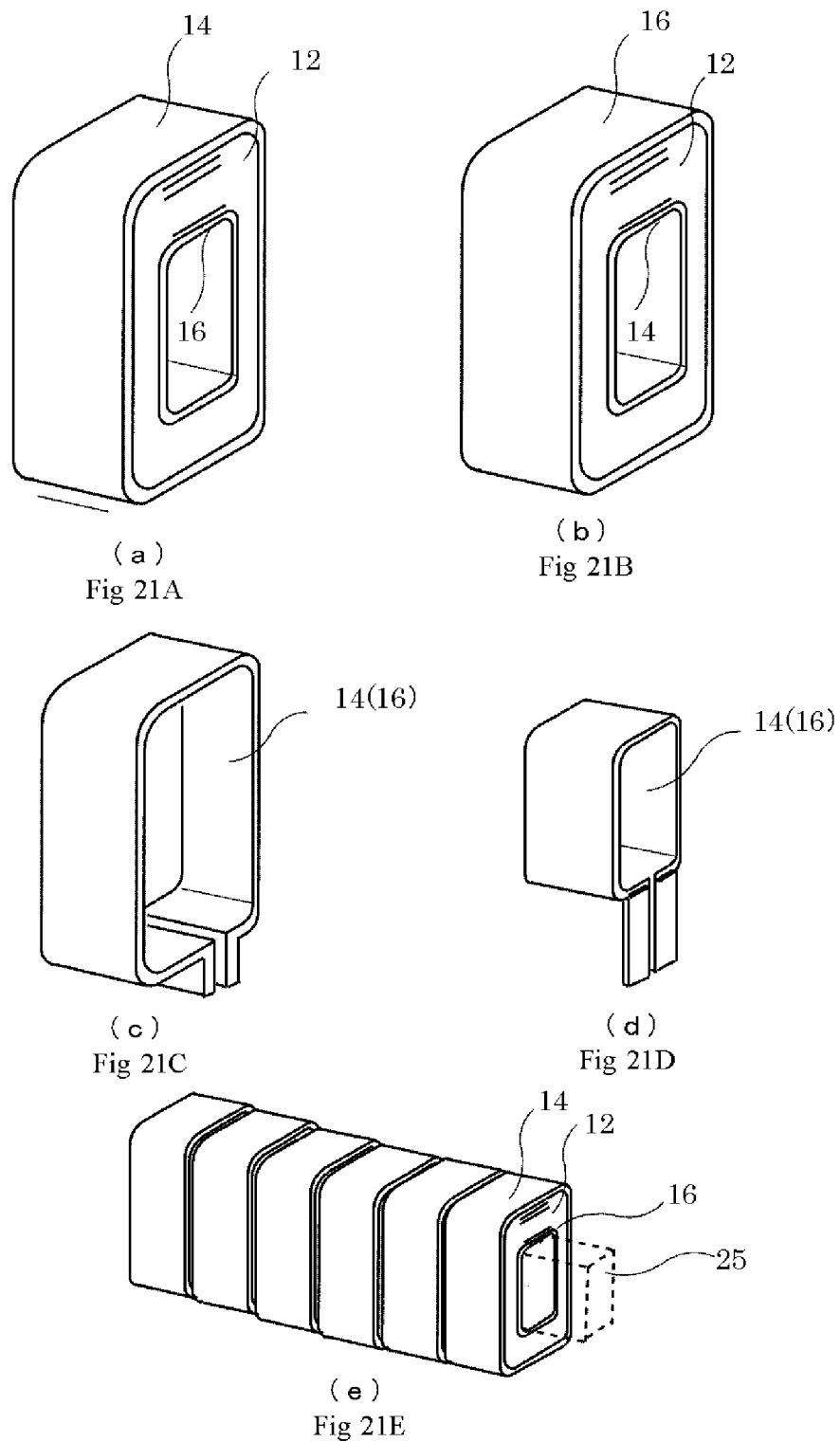
FIG. 21 is a sideview diagram of the primary coil 12, the positive side coil 14 and the negative side coil 16 of embodiment 4.

FIG. 21 is a sideview diagram of the primary coil 12, the positive side coil 14 and the negative side coil 16 of embodiment 4.

In the embodiment stated above, by arranging the primary coil 12, the positive side coil 14 and the negative side coil 16 without a gap as far as possible on the magnetic core 25, the leak magnetic flux is eliminated, and the magnetic coupling of respective coils is the most suitable. On the other hand, in the embodiment, through overlapping and rolling the primary coil 12, the positive side coil 14 and the negative side coil 16, the magnetic coupling degree of respective coils is raised.

FIG. 21A is a first coil unit that is coaxial rolled to arrange the negative side coil 16 in the center, arrange the primary coil 12 on the upper, and arrange the positive side coil 14 on the outer circumference. FIG. 21B is a second coil unit that is coaxial rolled to arrange the positive side coil 14 in the center, arrange the primary coil 12 on the upper, and arrange the negative side coil 16 on the outer circumference. Anyone of the positive side coil 14 and the negative side coil 16 is a one turn coil of the same width with the primary coil 12. The reason is to eliminate the leak magnetic flux, and to raise the magnetic coupling degree of the primary coil and the secondary coil. The sideview diagram is shown by FIG. 21C and FIG. 21D.

The first coil unit that is shown by FIG. 21A, and the second coil unit that is shown by FIG. 21B, are arranged without a gap on the magnetic core as shown by FIG. 21E. Thus, it is possible to make the leak magnetic flux from the nearby connected coils that are arranged in the axis direction of the magnetic core become the smallest. Further, because the primary coil 12 is arranged between the positive side coil 14 and the negative side coil 16, it is possible to make the magnetic coupling between the positive side coil 14 and the negative side coil 16 become small. The effect of reducing inductance during commutation time is obtained as the forgoing embodiment. Moreover, in the case that the unbalance of the characteristic of the positive side coil 14 and the negative side coil 16 is not served as a problem, a single body of the first coil unit or the second coil unit even becomes practical.

After what is mutually arranged that is shown by FIG. 21A and FIG. 21B, when the positive side coil 14 and the negative side coil 16 that are different in rolled route, are connected in series, or connected in parallel to be used, as the whole, it is possible to level the inductance of respective coils. Further, the positive side coil 14 and the negative side coil 16 are not directly nearby connected, so it is possible to make the magnetic coupling between the positive side coil 14 and the negative side coil 16 become small. Furthermore, after compared with the welding transformer shown by the embodiment above, it is possible to lower the manufacture cost of the positive side coil 14 and the negative side coil 16.

<Embodiment 5>

FIG. 22 is a main part sideview diagram showing a change example of an arrangement of the rectifying device.

FIG. 22A, as explained by FIG. 5A or FIG. 8 previously, arranges the rectifying device 18 and the rectifying device 20 between which the positive electric conductor 30 and the negative electric conductor 32 are sandwiched, and further arranges the first polar board 34 and the second polar board 36 on the both sides. The first polar board 34 and the second polar board 36 are connected by the third polar board 38. On the other hand, with respect to the FIG. 22B, the positive electric conductor 30 and the negative electric conductor 32 between which the insulation layer 31 is sandwiched, and only the negative electric conductor 32 is extended to one side. On the extension part of the negative electric conductor 32, the rectifying device 20 is arranged. The rectifying device 18 is sandwiched between the positive electric conductor 30 and the first polar board 34. The rectifying device 20 is sandwiched between the negative electric conductor 32 and the second polar board 36. With respect to the example, the first polar board 34 and the second polar board 36 are constructed through an electric current board of unity structure that is continued. Therefore, it is possible to regard the first polar board 34 and the second polar board 36 as a structure that is continued by the third polar board 38. Therefore, it has a function that is the same as the embodiment stated above. The effect of the embodiment B is as same as that of the embodiment A. The circuit reduces the inductance.

The welding transformer and the welding apparatus of the present invention of the above structure, in the case to see them electrically, and in the case to see them heatedly, have the following effects respectively.

(Electrical Effect)

(1) According that the first connection polar board 44 and the second connection polar board 46 are nearby arranged for electrically connecting the positive side coil 14 and the rectifying device 18, and the positive electric conductor 30 and the negative electric conductor 32 are nearby arranged, it is possible to make the inductance of secondary circuit in the commutation time become minimum, and is possible to shorten the commutation time.

(2) On the magnetic core, according that it is to be arranged to sandwich the primary coil between the positive side coil and the negative side coil of secondary coil, it is possible to restrain the lateness of the commutation of secondary electric current through the inductance of the positive side coil and the negative side coil of secondary coil.

(3) Because secondary coil in which large electric current flows, is scattered and arranged on the magnetic core, it is possible to make the magnetic flux scatter in the whole magnetic core, and is possible to prevent the magnetism saturation.

(4) If primary electric current control whose frequency is higher than before, it becomes possible to miniaturize the transformer that can supply large electric current, and becomes possible to raise the cooled efficiency.

(Heated Effect)

According that the secondary coil in which large electric current flows, is scattered and arranged on the magnetic core, and the primary coil is sandwiched, it is possible to make the radiation of heat of secondary coil become well. In the transformer that supplies large electric current, the primary coil and the secondary coil both generate heat. If they generate heat unusually, the obstacle such as that the insulation body is made to deteriorate and the like, occurs. The secondary coil in which large electric current flows, generates heat the most severely, but if it is cooled by supplying cooling water inside for the hole structure, it is possible to lower the temperature through the primary coil. Therefore, the primary coil that is sandwiched between the secondary coil, and the secondary coil are both cooled through the flowing cooled water. In the structure stated above, it is possible to cool the primary coil efficiency.

(Effect of Structure)

It is possible to form a flat and compact shape as the whole by arranging a coil group on the surface of one side of the contact base member, and by arranging such as the polar board and the like on the surface side of the other side. Therefore, it is possible to easily realize a welding transformer of a large capacity in a small size.

The welding apparatus of the present invention is not limited to the foregoing embodiments stated above. For example, it is to illustrate a copperplate in the circuits of the secondary circuit, and it is to show an example connecting respective parts on vis stop and the like. However, for example, the positive side coil 14 and the first connection polar board 44 may also be continuously unified. Further, the first connection polar board 44 and the positive electric conductor 30 may also be continuously unified. The first polar board 34, the second polar board 36 and the third polar board 38 in FIG. 22B may also be continuously unified. The negative side is the same. Further, respective polar boards may be board shape, may also be bar shape. It is desirable to establish a thru hole supplying the cooling water to the inside of respective secondary coils and polar boards.

[Embodiment 6]

Figure 24:
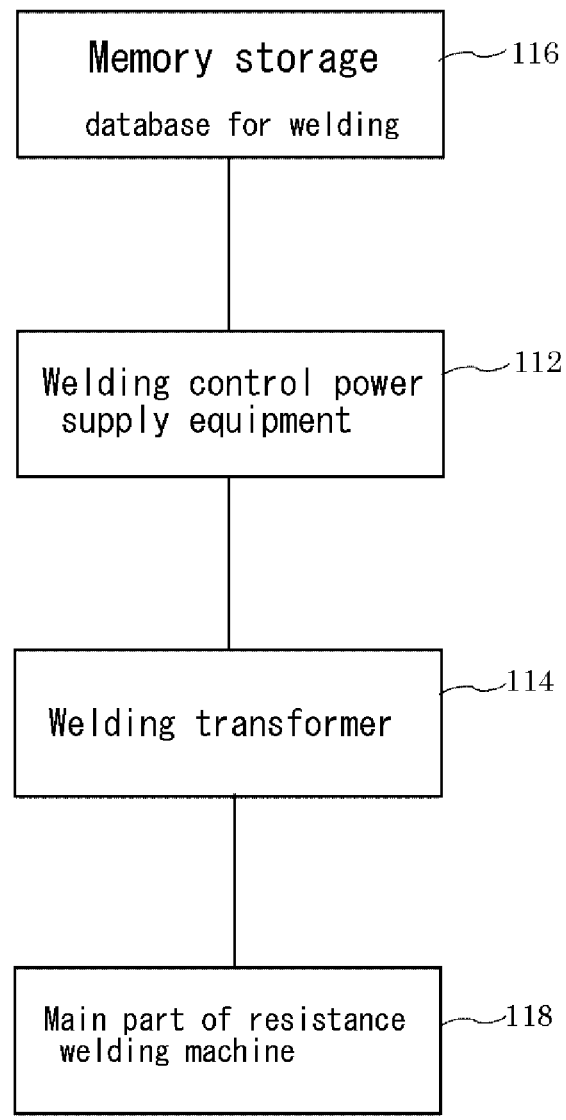
FIG. 24 is a block diagram of the welding equipment of this invention.
Figure 25:
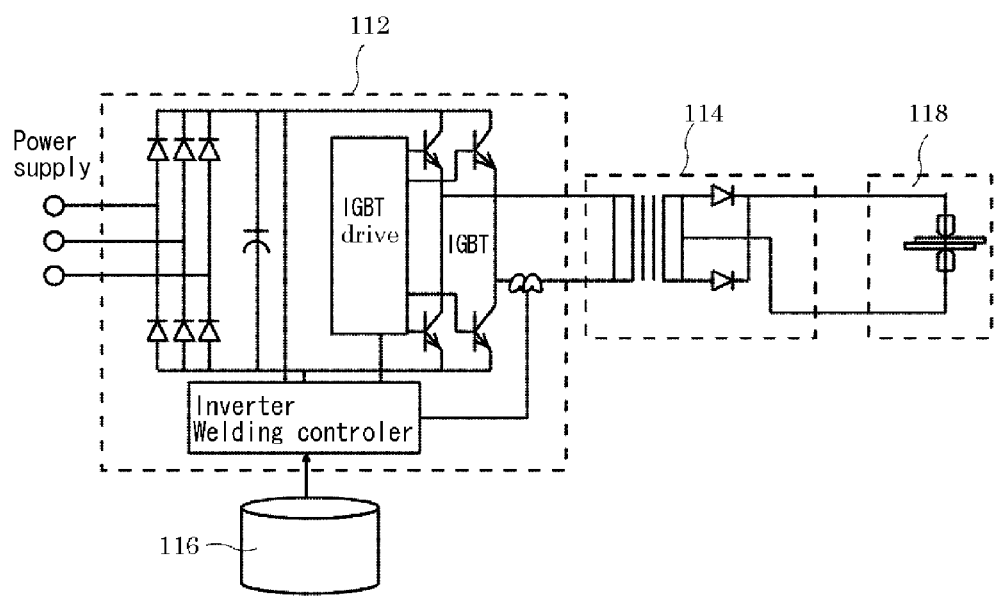
FIG. 25 is example of a circuit diagram of welding equipment.

Embodiments of the present invention will be described in detail herein below with reference to the drawings. FIG. 24 shows a block diagram of the welding equipment. FIG. 25 shows the examples of a circuit diagram of the welding control power supply equipment. FIG. 25 is the example of wire connection between the welding control power supply equipment 112, the welding transformer 114, and the main part of a resistance welding machine 118.

Figure 23:
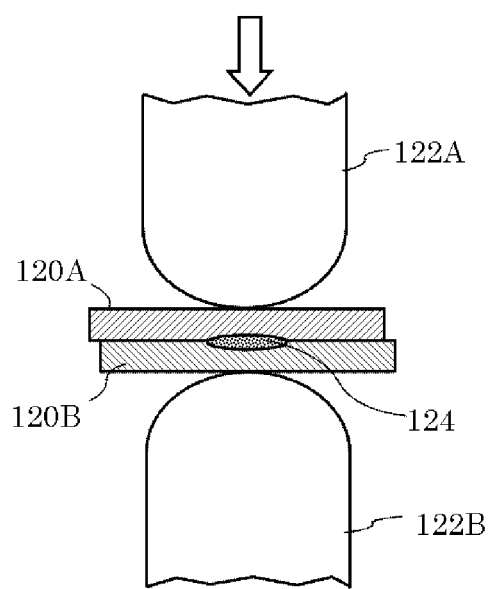
FIG. 23 is a principal part side view of the welding part.

The welding equipment of this invention includes a pair of electrodes 122A and 122B and the main part of a resistance welding machine 118. the main part of a resistance welding machine 118 gives desired pressurization power to the pair of electrodes 122A and 122B. The electrodes 122A and 122B pressurize the piled-up welding material 120A and 120B as shown in FIG. 23. The electrodes 122A and 122B supply welding current to the contact point between the welding material 120A and 120B.

The welding control power supply equipment 112 and the welding transformer 114 are for supplying desired welding current to the welding material 120A and 120B. A welding condition database is memorized in the memory storage 116. The welding condition database includes the data which specifies a level, supply timing, etc. of welding current by the welding control power supply equipment 112.

As it is explained using FIG. 23, the welding current is supplied between a pair of electrode 122A and 122B. As a result, a nugget 124 is generated at the contact point of the welding material 120A and 120B. A top of the electrode which touches welding material has a surface of a sphere or a loose truncated cone form.

After the resistance welding is complete, the nugget form formed as the top of the electrode. The Nugget becomes a round shape mostly and becomes a disk-like shape. The size of a nugget is shown by the diameter of the round shape (diameter of a nugget).

The welding control power supply equipment 112 controls secondary current of the welding transformer 114 by decomposition ability of 10 khz. The welding transformer 114 can supply about [5000 A-20000 A] welding current. The concrete structure will be illustrated later. The conventional welding transformer was controlled by about 1 kHz decomposition. In this embodiment, this equipment is about 1/10 conventional time unit (decomposition ability) about the welding current in early stages of welding, and can carry out increase-and-decrease control of the welding current.

FIG. 26 shows the relationship between time change of welding current and displacement of the electrode. When the welding current is supplied to the welding material which was shown in FIG. 23, the current flows through the contact point of the welding material. The welding material will start welding. By the welding method of this invention, the welding current is controlled as follows. The welding current in early stages of welding is controlled so that welding current becomes maximum from current supply start within 5 msecs (millimeter second). And the welding current is controlled so that welding current is ended from current supply start within 50 msecs.

In the example of FIG. 26, welding is completed by 15 msec. During process of welding, the nugget 124 is generated at the contact point of the two sheets of welding material 120A and 120B. The nugget 124 expands in the diameter direction and the thickness direction. The expanding power pushes and displaces the electrodes. If the displacement of the electrode is measured, the process of growth of a nugget can be measured indirectly.

FIG. 26 (a) shows the growth process of the welding portion when the welding current increases quickly to maximum within 5 msecs. FIG. 26 (b) shows the growth process of a welding portion when the welding current increases slowly to maximum over 300 msecs. It is the conventional method. In addition, as for FIG. 26 (b), only the amount of after [welding start] 15 msec displays.

FIGS. 26 (a) and (b) compare and show how the welding current in early stages of welding influences weld ability. In this example, the welding material is the colds rolling steel plate (SPC) of 1.2 mm thickness. These two steel plates are welded in piles.

FIG. 26 (a) shows amount of displacement of the electrode after 5 msecs from starting the welding current supply. In the case where the standup of welding current is made quickly, displacement of the electrode is 20 microm during 5 msec.

In the case where the control is as shown in FIG. 26 (b), displacement of the electrode is 5 microm during 5 msec. A large enough nugget cannot be formed during 15 msecs. The data shows that making rapid the standup of the welding current in early stages of welding, displacement of electrode increase about 4 times FIG. 27 (a) is sectional view of a welding part which shows the state of the nugget 125 after 15 msecs from the welding current supply start as shown in FIG. 26 (a). FIG. 27 (b) is sectional view of a welding part which shows the state of the nugget 125 after 15 msecs from the welding current supply start as shown in FIG. 26 (b). The diameter of a nugget and hauling strength are measured after current supply time 15 msec from the welding start. In the case of FIG. 27 (a), the diameters D1 of a nugget is 4 mm and hauling strength is 4.8 KN (kilo newton). In the case of FIG. 27 (b), the diameter D2 of a nugget is 3 mm and hauling strength is 3.0 KN.

A general welding quality index is considered as reference. The diameter of a nugget (4root t) is fiducially point. The case over this fiducially point is good welding. The case under this fiducially point is wrong welding. When board thickness t is 1.2 mm, (4root t) is 4.3 mm. The fiducially point is 4.3. In the case of FIG. 27 (a), the diameter of a nugget is the value almost near the fiducially point. In the case of FIG. 27 (b), the diameter of a nugget is smaller than a fiducially point. The welding time must be more long for growing up the nugget enough. In the conventional case, 300 msec of welding current is needed.

Figure 28:
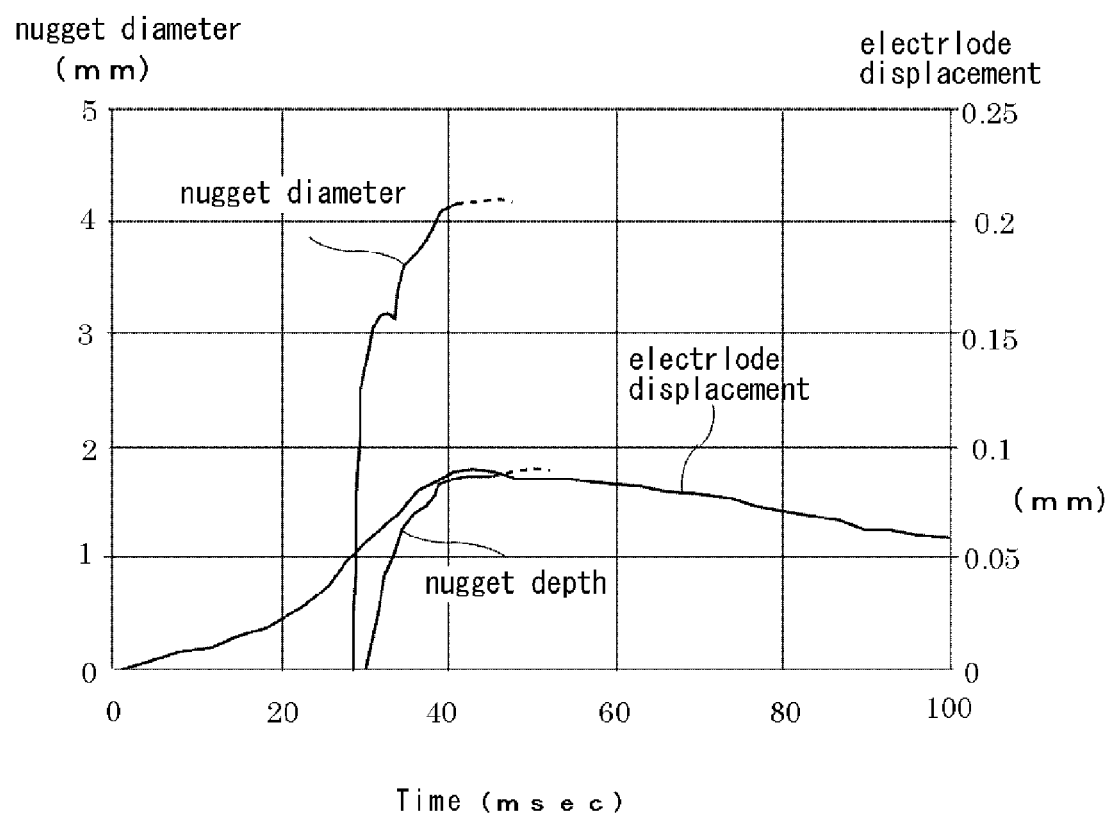
FIG. 28 is a diagram showing the example which welded two steel plates.

In FIG. 28, the colds rolling steel plate (SPC) of 1.2 mm of board thickness was used as welding material. It showed the example which welded these two steel plates by current supply time 40 msec in piles. The resistance welding method concerning this invention was enforced.

A maximum diameter of a nugget was 4.17 mm.
A maximum nugget depth was 1.73 mm.
Displacement of electrode was 89.8 micrometers.

Figure 29:
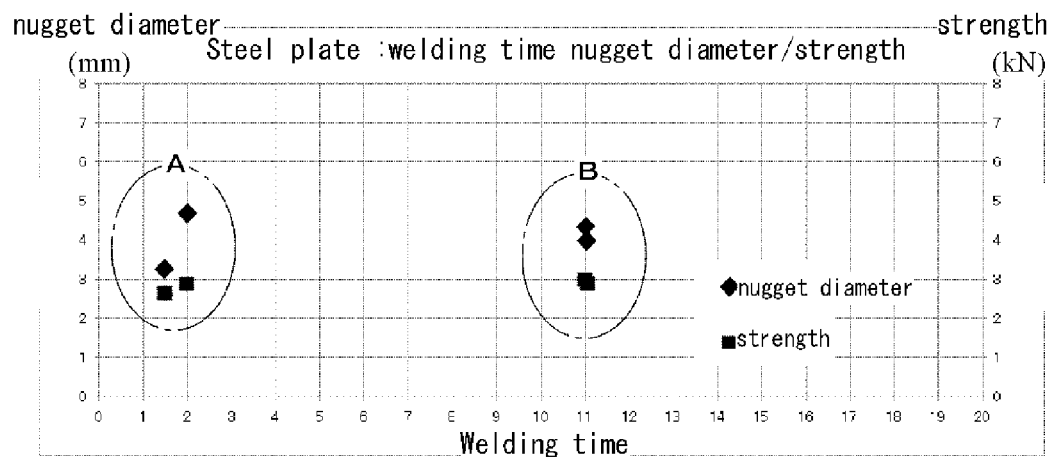
FIG. 29 is a comparison diagram of the diameter and strength of a nugget.

FIG. 29 is the example of measurement of the diameter of a nugget and strength. Electric galvanizing steel plate of 0.6 mm of board thickness was used as welded material. A-marked portion in a FIG. 29 is the example of measurement of the diameter of a nugget and hauling strength. The welding method of this invention is used. Welding current supply time was 40 msecs (two cycles). B-marked portion in a FIG. 29 is the example of measurement of the diameter of a nugget and hauling strength. The conventional welding method is used. Welding current supply time was 220 msecs (11 cycles).

The welding method of this invention required one fifth of current supply time than the conventional method for getting the nugget had same grade of the diameter and hauling strength. This shows that the welding method of this invention can realize fast energy saving as compared with the conventional welding method.

Figure 30:
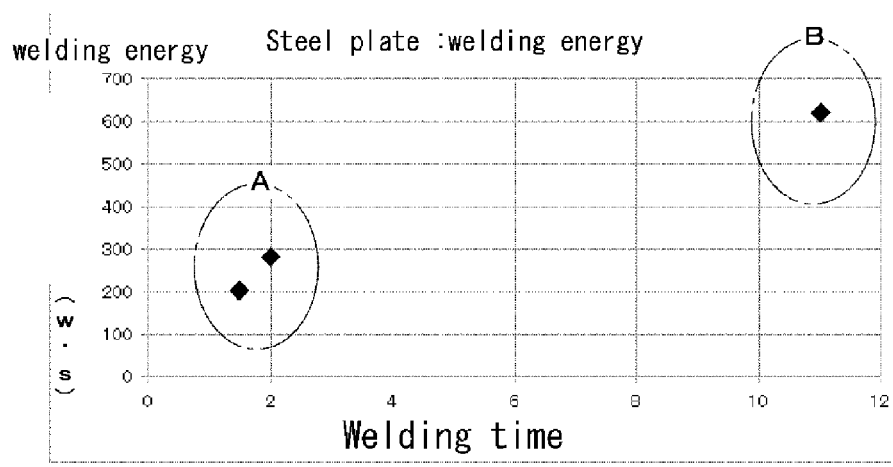
FIG. 30 is a comparison diagram of the welding energy.

FIG. 30 is the example of welding energy of measurement. The electric galvanizing steel plate of 0.6 mm of board thickness was used as welded material. A-marked portion in a FIG. 30 is the example of measurement of the welding energy. The welding method of this invention is used. Welding current supply time was 40 msecs (two cycles). B-marked portion in a FIG. 30 is the example of measurement of the welding energy. The conventional welding method is used. Welding current supply time was 220 msecs (11 cycles).

[Embodiment 7]

FIG. 31 shows the temperature change of the center of the welding part. This is compared with the method of this invention and conventional method paying attention to welding energy. By the conventional method, temperature of the welding part rise slowly like curvilinear B. After the temperature of a welding part exceeds melting point, generation of a nugget will be started. The nugget grows up to the suitable size after NT2 hour. Welding current is stopped here. Generally, a nugget is weld and solidified portion of disk like form. Welding portion before solidifying is called nugget in this invention.

The temperature of a welding part raises for a short time like curvilinear A by the method of this invention. After exceeding melting point, temperature is raised at a stretch to permissible value (t degree Centigrade). A nugget is grown up quickly. Thereby, a nugget grows to a suitable size in NT1 hour, which is shorter than NT 2 hour.

At the standup speed of welding current like curvilinear B, a nugget will grow up to suitable size before carrying out a temperature rise to the above-mentioned t degree Centigrade. A nugget cannot be grown up at a high temperature exceeding melting point. The method of this invention and conventional method was compared. By the conventional method, it had taken DT2 hour for the temperature of a welding part reached melting point of welding material. By the method of this invention, it had taken DT1 hour for the temperature of a welding part reached melting point of welding material.

FIG. 32 shows a diagram which compared the example of a temperature distribution around the nugget. By the method of this invention, DT1+NT1 hour is 15 msec as shown in FIG. 31. By the conventional method, DT2+NT2 is over 100 msec as shown in FIG. 31. Big difference exists among both. Heat radiation amount which radiate from a welding part is automatically determined according to the structure of a welding part or a cooling device performance. It is constant value. By the method of this invention as shown in FIG. 32A, heating the small domain around the nugget 124 is sufficient to complete welding. By the conventional method, welding is completed for a long time as shown in FIG. 32B. Heat spread on whole the outskirts of a nugget 124, and heat loss will increase.

Comparing with metal(gold, silver, copper and aluminum) and alloy(iron, cobalt, nickel, chromium, and tin),the thermal conductivity of alloy is about ⅕ than that of metal. Welding the alloy which has low thermal conductivity with large current 5000 A, a tendency is shown in FIG. 10 is seen notably. According to the experiment, it was find that a temperature distribution which is shown in FIG. 32A can be attained. DT1+NT1 hour was less than 50 msec, preferably less than 20 msec, As the welding time is short and a welding part of high temperature is small, the method of this invention can decrease energy loss sharply collectively. After piling two colds rolling steel plates of 1.0 mm thickness, the welding current of 13V55 00 A was supplied during 300 msec by the conventional method. A nugget with a diameter of 4 mm is formed. The welding machine supplied electrical energy 150 times as many energy as required for nugget formation. It can be said that heat loss was 99.5%. By the example of this invention, therefore, 5% of all supply energies are used for nugget formation as 15 msec supply of the welding current of 13V14000 A is carried out. In this example, the efficiency was 8 times than that of the conventional method.

Figure 33:
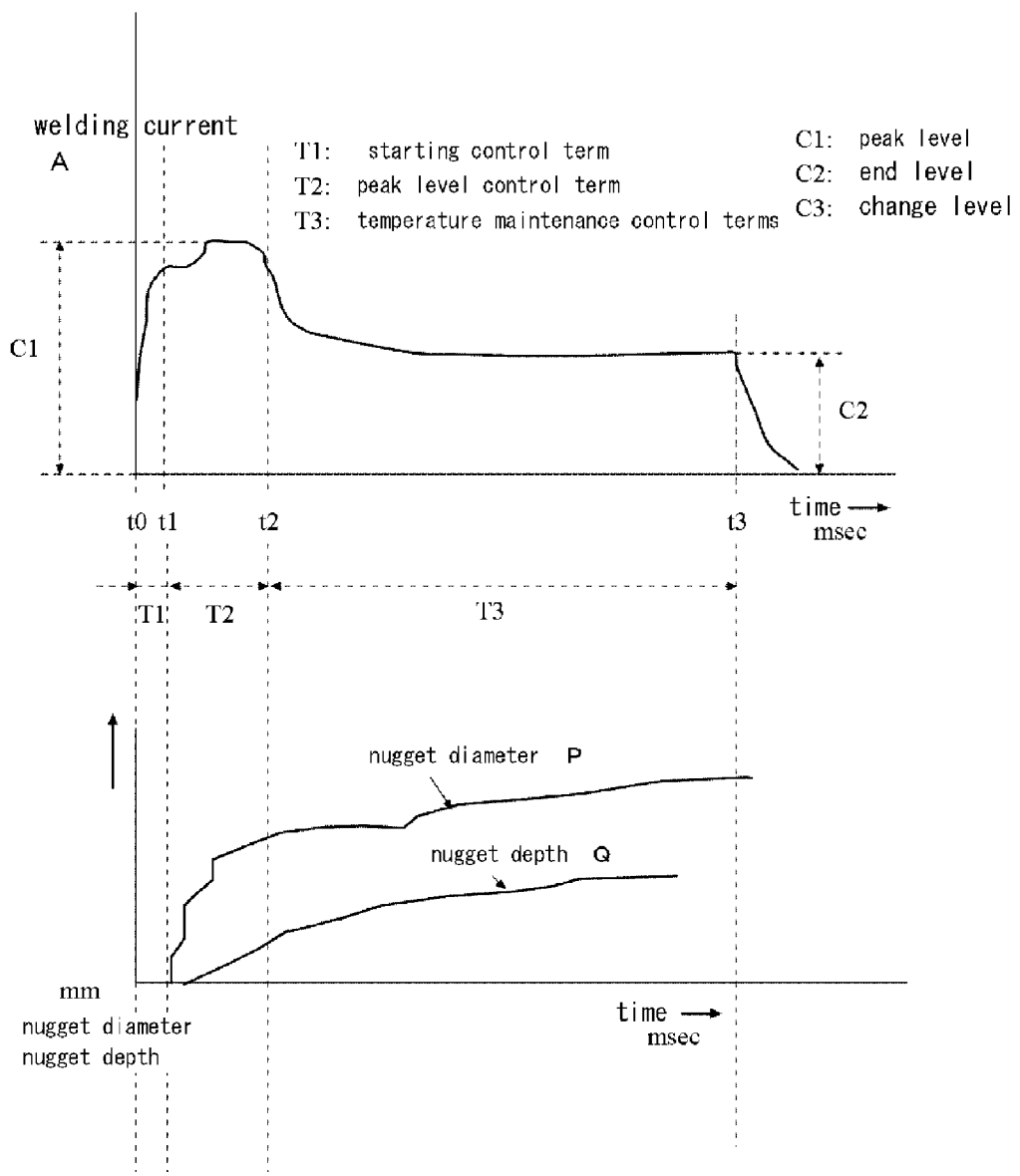
FIG. 33 is a diagram of the welding current control method of embodiment 7.

FIG. 33 is a diagram of the welding current control method of the example 2. This example explains a concrete control method of welding current. The graph of the upper part of the FIG. 33 shows time change of welding current. A vertical axis shows welding current (unit A), and a horizontal axis shows progress (unit msec) of time. The graph of the lower part of the FIG. 33 shows the state where diameter P (diameter of a welding portion) of a nugget increases with time, and a vertical axis shows the diameter of a nugget, or the nugget depth (unit mm). The scale of the horizontal axis of the two graphs is conformed.

Figure 34:
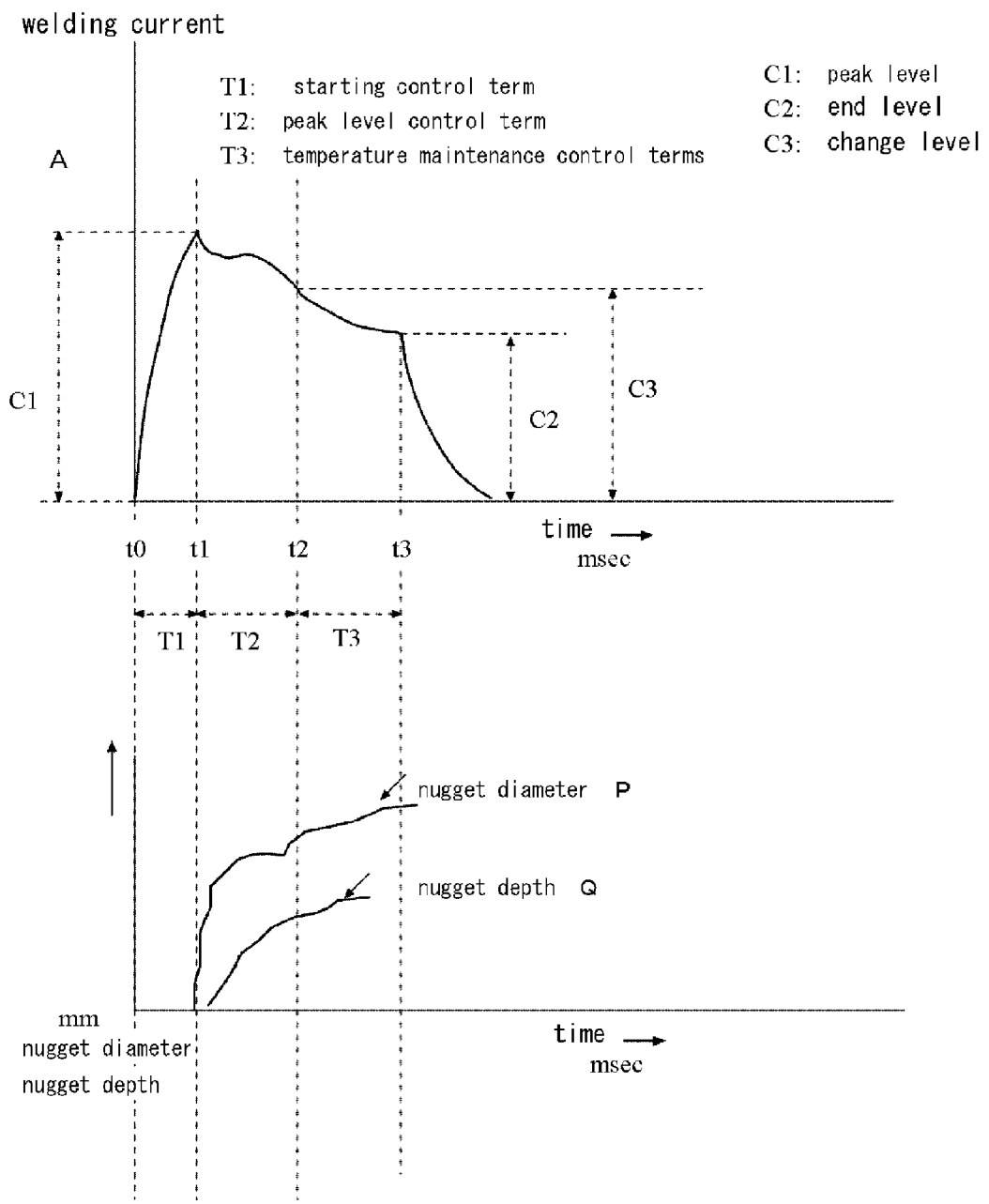
FIG. 34 is a diagram as a result of welding a colds rolling steel plate controlling by C1=14000 A and C2=10000 A.
Figure 35:
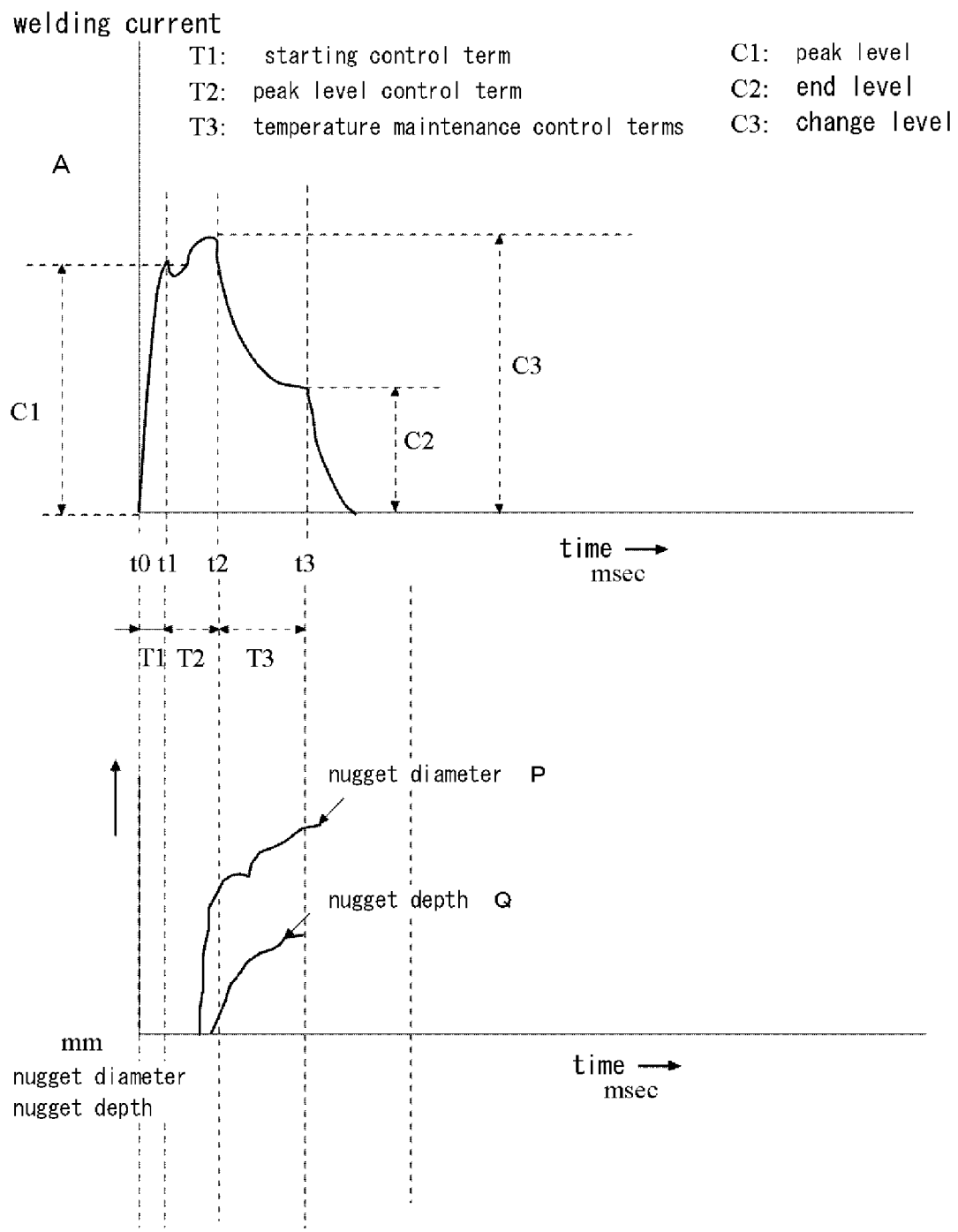
FIG. 35 is a diagram as a result of welding a stainless steel board controlling by C1=14000 A and C2=10000 A.

The welding transformer explained later is used. Welding current was supplied to the colds rolling steel plate. FIGS. 33, 34, and 35 shows time change of the welding current. The time-axis of the graph of a figure is separated to four for the following explanation. First, the term from the time t0 to t2 is referred to as term T1. The time t0 is time of stating the welding current. Term T1 is starting control part of the maximum increase rate of the welding current. Second, the term from the time t2 to t3 is referred to as term T2. Term T2 is peak revel control part which maintains the current of the predetermined level near the peak current value C1. Third, the term from t2 to the time t3 is referred to as term T3. The time t3 is the current interception time. Term T3 is temperature maintenance control pert. Fourth, the term after time t3 is cooling part. Welding part is naturally cooled in this therm.

By the method of this invention, the starting control term T1 is below the 10 mm second. Preferably desirable time is below a 10 mm second. Before heat energy spreads around, a narrow domain can be heated during a short time. It is desirable that (termT1+termT2) is below the 15 mm second. The temperature of a welding part is raised to the permissible value which exceeded melting point welding material in the meantime. In order to grow up a nugget in the rapid and normal state, it is made to go up to the optimum temperature. Then, in the temperature maintenance control term T3, predetermined temperature is maintained until a nugget is formed. (T1+T2+T3) is below a 50 mm second. Preferably it is below a 20 mm second. It is for terminating welding, before the state of FIG. 32A collapses.

Welding current is supplied for making the temperature of welding material go up to permissible value, The peak current value is C1. The current value of heating end is C2. The current value C1 and c2 is selected according to the kind of material. The peak level control term T2 and the temperature maintenance control time T3 are also selected according to the character of material. This data is included in the welding condition database shown in FIG. 24. This data is read from memory storage 116 (FIG. 24) at the time of welding start, and it is used for welding current control.

The quantity of heat energy supplied to a resistance welding part is proportional to square of the current value. Target temperature is set below to permissible value above melting point. A welding part reaches target temperature for a short time so that the current to supply is large. After a welding part reaches target temperature, the temperature around the nugget is maintained during the time according to the character of material. The nugget of a suitable size and the depth will be formed. Thereby, the welding part with sufficient strength is obtained.

It was difficult to rise welding current 5000 A or more quickly by the inductance of secondary circuit of a welding transformer conventionally. However, by a new welding transformer, it was enabled to raise welding current to the current value suitable for heating of a welding part by 5 or less msec. The welding transformer will be explained later. Subsequent precise current control was attained.

As FIG. 32 explained, Q is the quantity of heat energy which escapes from a welding part within a unit time. By supplying enough heat energy for a short time at a stretch compared with the Q, a surrounding temperature rise can be suppressed and the temperature of a welding part can be raised quickly. If heat energy continuously oversupplied after the temperature of a welding part reaches target temperature, the nugget of suitable form cannot be formed. There is also a possibility that the metal which melted may disperse.

Melting point of a colds rolling steel plate is about 1500 degrees Centigrade. If target temperature is set as 1800 degrees Centigrade, a nugget can be made to grow rapidly and safely. When 2000 degrees Centigrade is exceeded, adverse effects will be caused. The starting control term T1 was set up enough short. When the temperature of a welding part reached target temperature, peak level control was performed.

Explanation is given using the graph of FIG. 33. During the starting control term T1, welding current is controlled to restrict and to reach the maximum current quickly. Thereby, the starting speed of current becomes quick. When welding current approaches the peak current value C1, control is performed for preventing welding current becoming excessive. That is, it is controlled so that control current does not exceed the peak current value C1 at time t1. Since it is short-time control very much, stable control is not easy. Actual current value is changed a little.

A welding part reaches the target temperature more than melting point in the term from time t1 to time t2. The temperature of a welding part is maintained by the proper range after time t2. The welding current supplied is changed to the level which can maintain this temperature. Control current is gradually cut down from the peak current value C1 to the current value C2 at the time of a heating end. The temperature maintenance control time T3 is the time for standing by until a nugget grows up to be suitable form.

In the experiment, the colds rolling steel plate whose board thickness is 1.0 mm was used. The current value C2 was controlled by 7000 A at the time of a heating end. The starting control terms T1 were 5 msecs. The sum (T1+T2) of the starting control term T1 and the peak level control term T2 was 9 msec. The temperature maintenance control terms T3 were 31 msecs. (T1+T2+T3) was 40 msecs. The good nugget was formed.

FIG. 34 shows another experiment result. The colds rolling steel plate whose board thickness is 1.0 mm was used. The peak current value C1 was 14000 A. The current value C2 was controlled by 10000 A at the time of a heating end. The starting control terms T1 were 3 msecs. The sum (T1+T2) of the starting control term T1 and the peak level control term T2 was 9 msecs. The temperature maintenance control terms T3 were 6 msecs. (T1+T2+T3) was 15 msecs. The good nugget was formed.

FIG. 35 shows still another experiment result. The stainless steel board whose board thickness is 1.0 mm was used. The peak current value C1 was 14000 A. The current value C2 was controlled by 10000 A at the time of a heating end. The starting control terms T1 were 3 msecs. The sum (T1+T2) of the starting control term T1 and the peak level control term T2 was 6.5 msecs. The temperature maintenance control terms T3 were 8.5 msecs. (T1+T2+T3) was 15 msecs. The good nugget was formed.

The example of FIG. 35 with the example of FIG. 33 was compared. The time which passed the peak level control term T2 is t2. A temperature of a very small portion in which a nugget should be formed is just maintained after time t2 more than the temperature of melting point of welding material. The resistance of a melting portion increases as a nugget grows. Fixed current value is maintained. Calorific value will increase as a part of resistance gone up. Therefore, in order to maintain calorific value uniformly, as shown in the figure, current value is reduced gradually.

In order to grow up a nugget early more, more highly efficient power supply is needed. Such power supplies can decreases welding current value gradually as it is required. The capability to raise supply current value from zero to maximum within 3 msecs is required of the power supply. It is not easy to make current value increase rapidly to several 10,000 A for a short time called several millimeters second. After making current value increase rapidly, current control to which the current value is reduced at a stretch to target value is not easy after several millimeters second progress, either. The current control with very high accuracy is demanded. Below, the welding transformer in which such control is possible is illustrated.

Figure 36:
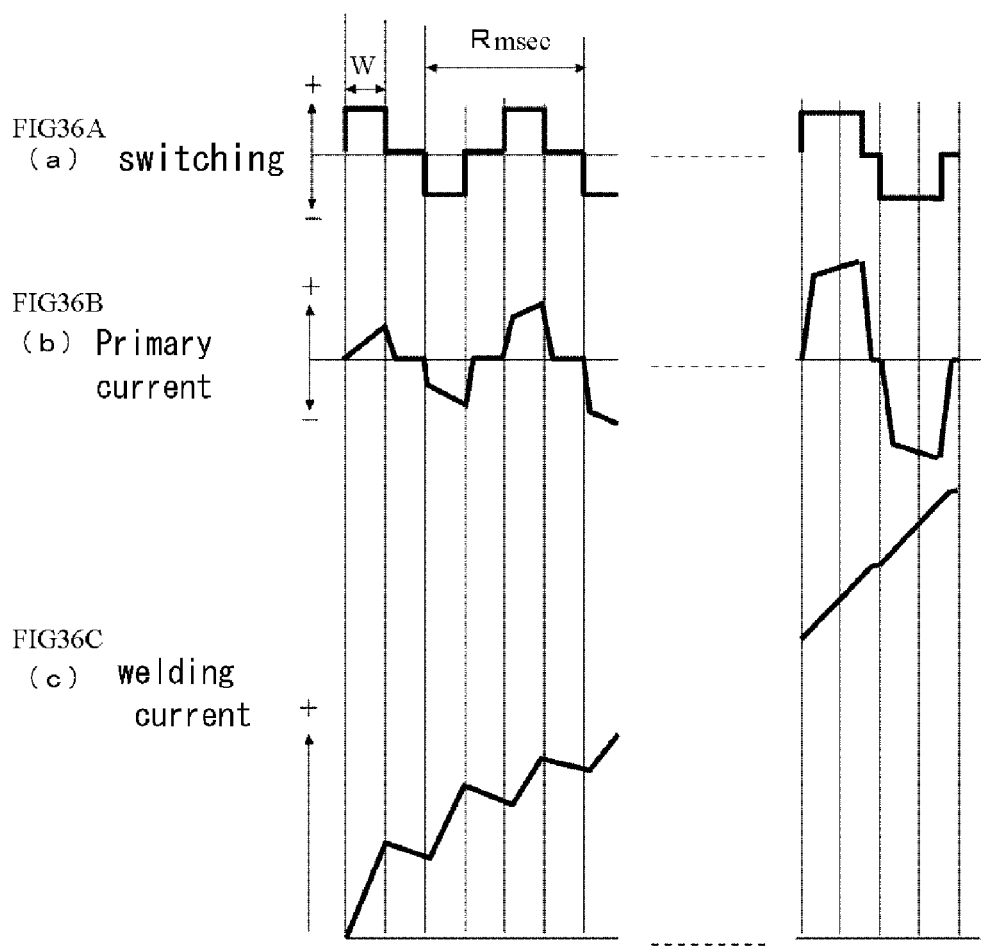
FIG. 36 is a diagram explaining concrete operation of a welding transformer.

FIG. 36 is a diagram explaining concrete operation of a welding transformer. The welding transformer explained using FIG. 35 is controlled by the timing which is shown in this figure. An inverter generates a control pulse at the timing shown in FIG. 36A, Switching control of the primary current of a welding transformer is carried out by this control pulse.

The pulse cycle of switching is Rmsec. Welding current is controlled by decomposition ability of 0.1 msec if switching frequency is 10 kHz. Primary current shown in FIG. 36B is fluctuated according to pulse width W of switching. Maximum welding current is supplied within 5 msecs. After that, welding current is maintained peak level within 5-10 msec like the above-mentioned case.

Under the influence of the inductance of secondary coil of a welding transformer and the conditions of a welding part, a response of welding current is overdue a little to change of switching pulse width. An irregular change of welding current appears as FIGS. 33 ? 35. The optimal condition of the control timing of a switching pulse is found according to welding material. The control timing is needed to make the above-mentioned welding condition database memorize. If welding control is carried out using such a welding transformer, the above-mentioned welding method is realizable.

Although resistance welding had been used in many industrial fields over many years, there was no big technical innovation. The mainstream moved from exchange formula resistance welding to inverter formula resistance welding, But the welding method did not changed. From the standpoint of earth-environment protection, the resistance welding method of this invention brings a big technical innovation. The method of this invention can shorten current supply time ⅕ or 1/10 of the conventional method. Therefore, rather than the conventional method, the method of this invention has the energy-saving effect near 1/10, and enables fast improvement in productivity.

According to this invention, only near the welding part is heated at high temperature, without heating the whole product to high temperature. Distortion by heat of a product decreases, and product quality improves. Since a product is not heated by high temperature to the surface, a glow, modification, etc. by overheating of the surface of a welding part or the back decrease. Simultaneously, fine surface of material can be held. This is an important effect of this invention.

The energy-saving effect by this invention can be used for all industries. Shortening of the current supply time in mass-production lines, such as the auto industry, brings the improvement in productivity, and enables a fast cost cut. The welding method of this invention can perform highly precise welding control in very small time. Therefore, the method of this invention contributes to the improvement in welding quality greatly.

REFERENCE SIGNS LIST 10 welding transformer
11 welding transformer assembly
12 primary coil
12a gaps
14 positive side coils
16 negative side coils
18 rectifying device
20 rectifying device
22 plus electrode
24 minus electrode
25 loop magnetic core
25a paralleling section
25b winding section 26 welding transformer
28 welding device
30 positive side electric conductor
31 insulation layer
32 negative side electric conductor
34 first polar board
36 second polar board
38 third polar board
44 first connection polar board
46 second connection polar board
48 third connection polar board
58 input terminal
60 band
62 contact base member
63 assistance contact base member
64 commonness plus electrode
66 commonness minus electrode
67 terminal
68 terminal
69 terminal
72 refrigerant supplying route
74 refrigerant supplying bolt
76 projection
78 electric conductor
80 projection
82 electric conductor
84 projection
86 projection
88 branch
90 electric conductor
112 Welding control power supply equipment
114 Welding transformer
116 Memory storage
118 Main part of resistance welding machine
120A steel plate
120B Steel plate
122A electrode
122B electrode
124 nugget

The invention claimed is:

1. A welding transformer, comprising:
a primary coil and a secondary coil are wound on a magnetic core, the secondary coil includes a positive side coil and a negative side coil being connected in series,
one terminal of the positive side coil is connected to one terminal of a first rectifier element, one terminal of the negative side coil is connected to one terminal of a second rectifier element, the other terminal of the first rectifier element and the other terminal of the second rectifier element are connected to a plus electrode together, the other terminal of the positive side coil and the other terminal of the negative side coil are connected to a minus electrode together, the secondary coil of the plus electrodes and minus electrodes are connected to a welding apparatus,
primary electric current is supplied from an inverter to the a primary coil, the primary electric current includes pulses which invert polarity alternatively of high frequency,
a primary coil is sandwiched between the positive side coil and the negative side coil,
one terminal of the positive side coil is electrically connected to a first connection polar board that is electrically connected to the positive side electric conductor, one terminal of the negative side coil is electrically connected to a second connection polar board that is electrically connected to the positive side electric conductor, the positive side electric conductor and the negative side electric conductor are coincided through an insulation layer, and
the first rectifier element is interposed between the positive side electric conductor and the first polar board, the second rectifier element is interposed between the negative side electric conductor and the second polar board, the first polar board and the second polar board are electrically connected to a third polar board, the third polar board is electrically connected to a plus electrode, the other terminal of the positive side coil and the other terminal of the negative side coil are connected to a minus electrode.

2. The welding transformer according to claim 1, wherein plural positive side coils and plural negative side coils are alternately arranged, a primary coil is divided into plural parts, and the plural parts are inserted between the positive side coils and negative side coils, the plural parts of the a primary coil are serial connected or partially parallel connected,
the positive side coils are parallel connected or partially serial connected, the negative side coils are parallel connected or partially serial connected,
the positive side coils and the negative side coils are serial connected, one terminal of the positive side coils is connected to the first connection polar board, one terminal of the negative side coils is connected to the second connection polar board, the other terminal of the positive side coils and the other terminal of the negative side coils are connected to the third connection polar board.

3. The welding transformer according to claim 2, wherein a primary coil is divided into plural parts, and wound on the magnetic core, the plural positive side coils and the plural negative side coils are alternately inserted between the plural parts.

4. The welding transformer according to claim 3, wherein the one turn coil that cuts and processes copperplate in C word shape, is two connected in series to be used in the secondary coil.

5. The welding transformer according to claim 1, wherein the negative side coil and the primary coil and the positive side coil are coaxial rolled to be overlapped on the magnetic core, or the positive side coil and the primary coil and the negative side coil are coaxial rolled to be overlapped on the magnetic core.

6. The welding transformer according to claim 1, wherein the first unit comprises the negative side coil and the primary coil and the positive side coil are coaxial rolled to be overlapped on the magnetic core, the second unit comprises the positive side coil and the primary coil and the negative side coil are coaxial rolled to be overlapped on the magnetic core, the first unit and the second unit alternatively are arranged without a gap on the magnetic core.

7. A welding transformer which is supplied high frequency AC current into a primary coil and output DC current from a secondary coil for supplying the output current to a welding apparatus, comprising:
a loop magnetic core that is constructed from paralleling sections and winding sections of U-word shape on both ends;
a primary coil that is wound on the paralleling section of the loop magnetic core and is divided into plural parts by making gaps a;
a secondary coil that is wound on the paralleling section of the loop magnetic core together with the primary coil and has plural positive side coils and plural negative side coils that are alternately arranged in the respective gaps a; and a contact base member that has an electric conductor group to electrically connecting terminals of the positive side coil and the negative side coil so that the plural positive side coils are all connected in parallel, or, the whole or a part of the plural positive side coils are connected in series; so that the plural negative side coils are all connected in parallel, or, the whole or a part of the negative side coils are connected in series; and so that the connected plural positive side coils and the connected plural negative side coils are mutually connected in series, and that supports and fixes all the positive side coils and the negative side coils on one surface through the electric conductor group, wherein one terminal of the plural positive side coils is electrically connected to a first connection polar board that extends along a direction parallel with the paralleling section of the loop magnetic core on other surface of the contact base member;

one terminal of the plural negative side coils is electrically connected to a second connection polar board that extends along the direction parallel with the paralleling section of the loop magnetic core on the other surface side of the contact base member;

other terminals of the positive side coil and the negative side coil are together electrically connected to a third connection polar board that extends along the direction parallel with the paralleling section of the loop magnetic core on the other surface side of the contact base member;

on the first connection polar board, a positive side electric conductor is connected;

on the second connection polar board, a negative side electric conductor is connected;

the positive side electric conductor and the negative side electric conductor are a pair of electric conductor boards that are coincided through an insulation layer that is arranged on the interface extending along a direction that is perpendicularly separate from the other surface of the contact base member; and the pair of electric conductor boards, include:

a first rectifier element that makes the positive side electric conductor touch negative pole and makes a first polar board touch positive pole by sandwiching it between the positive side electric conductor and the first polar board;

a second rectifier element that makes the negative side electric conductor touch negative pole and makes a second polar board touch positive pole by sandwiching it between the negative side electric conductor and the second polar board; and a third polar board that supports the first polar board and the second polar board, and then electrically connects the both.

8. The welding transformer according to claim 7, wherein the contact base member has a hole part, and the hole part constructs a refrigerant route.

9. The welding transformer according to claim 8, wherein anyone of the positive side coil, the negative side coil and the contact base member have a hole part, and respective parts are connected in plumbing, and then a refrigerant route is constructed.

10. The welding transformer according to claim 7, wherein the keyboard forms a section L-word shape so as to support two side surfaces of the coil group on a condition to sandwich the positive side coil and the negative side coil into a gap a of the primary coil per one.

11. A welding transformer which is supplied high frequency AC current into a primary coil and output DC current from a secondary coil for supplying the output current to a welding apparatus, comprising:

a loop magnetic core that is constructed from a paralleling section and a winding section of the U-word shape of the both ends;

a part that is alternately interactive inseparably arranged a first coil unit that is coaxial rolled so as to collocate a negative side coil in the center, collocate a primary coil on the above, and collocate a positive side coil on the above periphery, with a second coil unit that is coaxial rolled so as to collocate a positive side coil in the center, collocate a primary coil on the above, and collocate a negative side coil on the above periphery; and a contact base member that has an electric conductor group to electrically connecting terminals of the positive side coil and the negative side coil so that the plural positive side coils are all connected in parallel, or, the whole or a part of the plural positive side coils are connected in series; so that the plural negative side coils are all connected in parallel, or, the whole or a part of the negative side coils are connected in series; and so that the connected plural positive side coils and the connected plural negative side coils are mutually connected in series, and that supports and fixes all the positive side coils and the negative side coils on one surface through the electric conductor group, wherein one terminal of the plural positive side coils is electrically connected to a first connection polar board that extends along a direction parallel with the paralleling section of the loop magnetic core on other surface of the contact base member;

one terminal of the plural negative side coils is electrically connected to a second connection polar board that extends along the direction parallel with the paralleling section of the loop magnetic core on the other surface side of the contact base member;

other terminals of the positive side coil and the negative side coil are together electrically connected to a third connection polar board that extends along the direction parallel with the paralleling section of the loop magnetic core on the other surface side of the contact base member;

on the first connection polar board, a positive side electric conductor is connected;

on the second connection polar board, a negative side electric conductor is connected;

the positive side electric conductor and the negative side electric conductor are a pair of electric conductor boards that are coincided through an insulation layer that is arranged on the interface extending along a direction that is perpendicularly separate from the other surface of the contact base member; and the pair of electric conductor boards, include:

a first rectifier element that makes the positive side electric conductor touch negative pole and makes a first polar board touch positive pole by sandwiching it between the positive side electric conductor and the first polar board;

a second rectifier element that makes the negative side electric conductor touch negative pole and makes a second polar board touch positive pole by sandwiching it between the negative side electric conductor and the second polar board; and a third polar board that supports the first polar board and the second polar board, and then electrically connects the both.

12. The welding transformer according to claim 11, wherein the contact base member has a hole part, and the hole part constructs a refrigerant route.

13. The welding transformer according to claim 12, wherein anyone of the positive side coil, the negative side coil and the contact base member have a hole part, and respective parts are connected in plumbing, and then a refrigerant route is constructed.

14. The welding transformer according to claim 11, wherein the keyboard forms a section L-word shape so as to support two side surfaces of the coil group on a condition to sandwich the positive side coil and the negative side coil into a gap a of the primary coil per one.

15. A welding transformer assembly, comprising: at least two welding transformers according to claim 1.

16. The welding transformer assembly according to claim 15, wherein, the at least two welding transformers are combined, the paralleling section of the loop magnetic core of respective welding transformers becomes mutually parallel, a surface that is parallel with a surface extending along a direction that is perpendicularly separate from the other surface of the contact base member is opposite, respective plus electrodes that are connected to respective third polar boards of respective welding transformers, are connected and fixed through a commonness plus electrode, and respective minus electrodes of the stated respective welding transformers are connected and fixed through a commonness minus electrode.

17. The welding transformer assembly according to claim 15, wherein the plus electrode, the minus electrode, the third polar board, and a refrigerant supply mouth are arranged on the two side outside surfaces that are parallel with a surface extending along a direction that is perpendicularly separate from the other surface of the contact base member.

18. A welding apparatus, comprising: a welding transformer according to claim 1.

19. A welding apparatus, comprising: a welding transformer assembly according to claim 12.

\* \* \* \* \*